(12) United States Patent
Chino et al.

(10) Patent No.: US 6,372,855 B1
(45) Date of Patent: Apr. 16, 2002

(54) POLYMER CONTAINING ISOBUTYLENE AS REPEATING UNIT AND RUBBER COMPOSITION CONTAINING THE SAME

(75) Inventors: Keisuke Chino; Masahiro Ikawa; Hidekazu Onoi, all of Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 09/377,102

(22) Filed: Aug. 19, 1999

(30) Foreign Application Priority Data

| Aug. 31, 1998 | (JP) | 10-245133 |
| Oct. 1, 1998 | (JP) | 10-280185 |
| Dec. 11, 1998 | (JP) | 10-353242 |
| May 31, 1999 | (JP) | 11-152008 |

(51) Int. Cl.$^7$ .................................................. C08F 8/30
(52) U.S. Cl. ........................... 525/327.4; 525/327.6; 525/333.7; 525/333.9; 525/374; 525/376; 525/377; 525/384; 525/385
(58) Field of Search .......................... 525/327.4, 327.6, 525/333.9, 333.7

(56) References Cited

U.S. PATENT DOCUMENTS 4,121,027 A * 10/1978 Pohlemann et al. ..... 525/333.9
4,551,504 A * 11/1985 Barnabeo ................. 525/333.9
5,780,531 A * 7/1998 Scholl ....................... 525/333.9

* cited by examiner

*Primary Examiner*—Bernard Lipman
(74) *Attorney, Agent, or Firm*—Arent Fox Kintner Plotkin & Kahn, PLLC

(57) ABSTRACT

A modified polybutene(polyisobutylene) containing isobutylene repeating units and having, in the main chain, at the ends, and/or at the side chains of the polymer chain thereof, free radicals stable at a room temperature and in the presence of oxygen, or having a half-ester structure, amide structure, onium salt structure, or imide structure or acid anhydride residual group, as well as a rubber composition containing the same.

4 Claims, No Drawings

POLYMER CONTAINING ISOBUTYLENE AS REPEATING UNIT AND RUBBER COMPOSITION CONTAINING THE SAME

BACKGROUND OF THE INVENTION

1. Field of the Invention

The present invention relates to a modified polybutene or polyisobutylene polymer and a rubber composition containing the same. More specifically, it relates to a modified polybutene or polyisobutylene having the improved tan δ balance of a rubber composition when compounded into a rubber composition (i.e., the tan δ at 0° C. is increased and the tan δ at 60° C. is decreased), having the improved reinforcing effect of a filler such as carbon black, and having the improved abrasion resistance and also relates to a rubber composition containing the same, in particular a rubber composition useful as a tire tread of a pneumatic tire.

2. Description of the Related Art

A polymer containing isobutylene as a monomer, in particular, a so-called butyl rubber, exhibits a high grip property since the tan δ is higher over a broad range of a temperature and is believed to improve the wet braking performance since the tan δ at 0° C. is high. However, polymers containing isobutylene as a monomer have a small amount of double bonds in the molecule, and therefore the reinforcement with the carbon black is not sufficient and, as a result, the abrasion resistance is inferior.

On the other hand, these polymers have been developed as rubber compositions for pneumatic tires, in particular, tire treads. Under these circumstances, it is known in the art that an oil such as an aromatic oil is added to the rubber composition at the time of compounding the rubber for the purposes of reducing costs, improving the processability (i.e., reducing the viscosity of the composition), improving the physical properties (i.e., reducing the modulus and raising the elongation), etc. However, the addition of an oil has the problem that the compounded oil easily bleeds out from the vulcanized product and decreases the vulcanized rubber properties (e.g., tan δ balance and abrasion resistance).

SUMMARY OF INVENTION

Accordingly, an object of the present invention is to eliminate the problems of a polymer containing isobutylene as a monomer, such as the above-mentioned conventional butyl rubber, and to provide a modified polybutene (polyisobutylene) which is useful for a rubber composition, having a high tan δ at 0° C. (i.e., is superior in wet braking property) and has a low tan δ at 60° C. (i.e., is superior in fuel consumption) and which is superior in the balance of the tan δ, without substantially reducing the abrasion resistance, and to a rubber composition containing the same.

Another object of the present invention is to provide a rubber composition which is capable of solving the problems of the above-mentioned conventional oil-formulated rubber composition, is capable of improving the processability of the rubber composition due to the softening effect thereof, and has the superior tan δ balance and the improved abrasion resistance.

A further object of the present invention is to provide a modified polybutene(polyisobutylene) which is useful for a tire, having the improved reinforcing properties, viscoelastic properties and abrasion resistance, and to provide a rubber composition containing the same.

In accordance with the present invention, there is provided a polymer comprising isobutylene repeating units and having backbone, at the ends, and/or at the side chains of the molecule thereof, at least one free radical selected from the group consisting of nitroxide radicals, hydrazyl radicals, aryloxy radicals, and trityl radicals stably present at a room temperature and in the presence of oxygen.

In accordance with the present invention, there is also provided a modified polybutene(polyisobutylene) comprising isobutylene as repeating units and having, in the backbone, at the ends, and/or at the side chains of the molecule thereof, at least one structure selected from the group consisting of (A) a half-ester structure, (B) an amic acid structure, (C) an onium salt structure, and (D) an imide structure, and a rubber composition containing said modified polymer.

In accordance with the present invention, there is further provided a rubber composition comprising 100 parts by weight of at least one starting diene rubber, at least 20 parts by weight of at least one filler, and 0.1 to 80 parts by weight of at least one acid anhydride-modified polybutene containing 50 mol % or more of isobutylene unit and having an alkenyl group.

In accordance with the present invention, there is further provided a polymer comprising isobutylene, as at least one monomer, and having an alkoxysilane and at least one hydrogen bondable moiety selected from the group consisting of a carboxylic acid, amide, ester, hydroxyl group and amino group in the molecule thereof.

DESCRIPTION OF PREFERRED EMBODIMENT

According to the first aspect of the present invention, as explained above, by introducing into the polybutene (polyisobutylene), preferably the end of the polymer thereof, a free radical compound stable at a room temperature and in the presence of oxygen, when the main chain of the starting rubber is radically cut, the cut radicals of the rubber are trapped with the free radicals and a block copolymer is produced in the system. This block copolymer has a high double bond content, and therefore interacts with the carbon black and, as a result, the reinforcing effect of the carbon black is increased. Therefore it is possible to increase the tan δ at 0° C. and to decrease the tan δ at 60° C., without substantially decreasing the abrasion resistance.

According to the present invention, preferably free radicals stably present at a room temperature and in the presence of oxygen are introduced into the polymer having the isobutylene as repeating units, preferably into the chain ends. Examples of such free radicals are nitroxide radicals, hydrazyl radicals, aryloxy radicals, and trityl radicals. Further, as the polymer having the isobutylene as repeating units, that is, the polymer obtained from the polymerization of isobutylene as a monomer, polyisobutylene, polybutene, butyl rubber, brominated butyl rubber, isobutylene maleate anhydride copolymer, isobutylene-p-methyl styrene-p-bromomethyl styrene copolymer, etc. are known. Of course, the polymer of the present invention is not intended to limit to these polymers.

According to the present invention, as shown in the Production Examples I-1 to I-3 below, it is possible to obtain the desired polymer by reading a polymer having isobutylene as repeating units with a compound having the free radicals. In the reaction, it is preferable to react the polymer having the isobutylene as repeating units with the free radical compound at a desired position, for example, at the end of the polymer chain, and modify the same with any reactive group so as to cause the bonding of the free radicals. Examples of such reactive groups are an alkoxysilyl group, acid anhydride group, ester group etc. These may be appropriately determined by a person skilled in the art. Further, the reaction conditions are not particularly limited.

The polybutene(polyisobutylene) according to the present invention is compounded into 100 parts by weight of a rubber generally used as a rubber composition in the past, especially, a starting diene rubber, in an amount of 0.1 to 100 parts by weight, preferably 1 to 30 parts by weight. If the content is too small, there is a tendency for no substantial additional effect, whereas if too large, the mixablility and rollability tend to be poor and the bleeding is caused, after vulcanization, to thereby remain a tack.

When mixing the silica into the rubber composition according to the present invention, in the same way as in the prior art, for example, it is possible to use a silane coupling agent in an amount of 5 to 30% by weight of the content of silica. Further, in this case, it is possible to mix a silanol condensation catalyst in an amount of 0.05 to 50% by weight of the content of the silane coupling agent. As the silane coupling agent usable for the silica-containing rubber composition according to the present invention, it is possible to select any silane coupling agent optionally used as a silica filler in the past. As typical examples, vinyl trimethoxysilane, vinyl triethoxysilane, vinyl tris(2-methoxyethoxy)silane, N-(2-aminoethyl)3-aminopropylmethyl dimethoxysilane, N-(2-aminoethyl)3-aminopropyl trimethoxysilane, 3-aminopropyl triethoxysilane, 3-glycidoxypropyl trimethoxysilane, 3-glycidoxypropylmethyl dimethoxysilane, 2-(3,4-epoxycyclohexyl)ethyl trimethoxysilane, 3-methacryloxypropyl trimethoxysilane, 3-mercaptopropyl trimethoxysilane, 3-aminopropyl trimethoxysilane, bis-[3-(triethoxysilyl)-propyl]tetrasulfide, etc. may be mentioned. Among these, bis-[3-(triethoxysilyl)-propyl]tetrasulfide is most preferred from the standpoint of the processability.

The rubber composition according to the present invention may also contain therein various additives generally mixed in for other general rubber use such as vulcanization or cross-linking agents, vulcanization or cross-linking accelerators, various types of oils, antioxidants, fillers, plasticizers, and softening agents. The mixture may be kneaded and vulcanized by a general method to produce the composition which may in turn be used for the vulcanization or cross-linking. The contents of the additives may be made the general contents of the prior art in so far as the objects of the present invention are not impaired.

The rubber composition according to the present invention may be used not only for tires, but also for belts, hoses, rubber shock absorbers, rollers, sheet linings, rubberized cloth, seal materials, gloves, fenders, and the like.

According to the second aspect of the present invention, as explained above, due to the modified polybutene (polyisobutylene) containing isobutylene as repeating units and having, in the main chain, at the ends, and/or at the side chains of the polymer thereof, at least one structure selected from the group consisting of (A) a half-ester structure, (B) an amic acid structure, (C) an onium salt structure, and (D) an imide structure, it is possible to increase the tan δ at 0° C. and to decrease the tan δ at 60° C., without substantially decreasing the abrasion resistance.

According to the second aspect of the present invention, the above-mentioned object can be achieved by introducing a half-ester structure (A), or amic acid structure (B), an onium salt structure (C), and/or an imide structure (D) into the molecule of the polymer having the isobutylene as repeating units (i.e., in the main chain, at the ends, and/or at the molecule side chains of the polymer thereof), preferably at the ends of the polymer chain.

The half-ester structure (A) (i.e., a structure having an ester group and a carboxyl group simultaneously in the molecule) is mainly comprised of a structure of the formula (I):

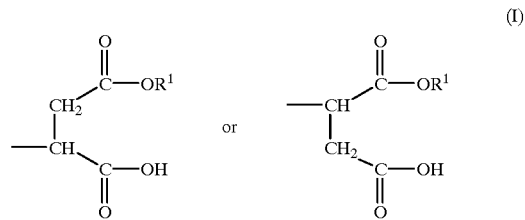

(I)

wherein $R^1$ is a $C_1$ to $C_{25}$ hydrocarbon group which may contain an oxygen atom, nitrogen atom and/or silicon atom, preferably a long-chain alkyl group such as a stearyl group.

It has been found that, by compounding into the rubber composition, a modified polybutene(polyisobutylene) containing this structure in the polymer thereof, the affinity with the filler is improved and, at the same time, the reinforcement effect is improved due to the so-called pseudo cross-linking effect caused by the hydrogen bond and the viscbelastic properties and the abrasion resistance are improved.

Further, the amic acid structure (B) (i.e., a structure having an amide group and a carboxyl group simultaneously in the molecule) is mainly composed of a structure having formula (II);

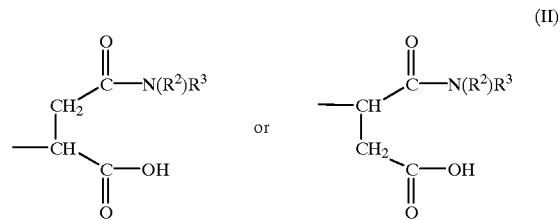

(II)

wherein $R^2$ and $R^3$ are independently a hydrogen atom or a $C_1$ to $C_{25}$ hydrocarbon group which may contain an oxygen atom, nitrogen atom and/or silicon atom preferably a long-chain alkyl group such as a stearyl group.

It has been found that, by compounding into the rubber composition, a modified polybutene(polyisobutylene) containing this structure in the polymer, the affinity with the filler is improved and, at the same time, the reinforcement effect is improved due to the so-called pseudo cross-linking effect of the hydrogen bond and the viscoelastic properties and the abrasion resistance are improved.

Further, the onium salt structure (C) is mainly composed of a structure having the formula (III):

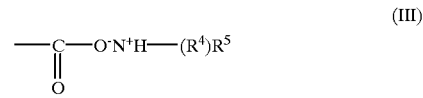

(III)

wherein $R^4$ and $R^5$ are independently a hydrogen atom or a $C_1$ to $C_{25}$ hydrocarbon group which may contain an oxygen atom, nitrogen atom and/or silicon atom, preferably a long-chain alkyl group such as a stearyl group.

It has been found that, by compounding into the rubber composition, a modified polybutene(polyisobutylene) containing this structure in the polymer, the affinity with the filler is improved and, at the same time, the reinforcement effect is improved due to the so-called pseudo cross-linking effect of the hydrogen bond and the viscoelastic properties and the abrasion resistance are improved.

Further, the imide structure (D) is mainly composed of a structure having the formula (IV):

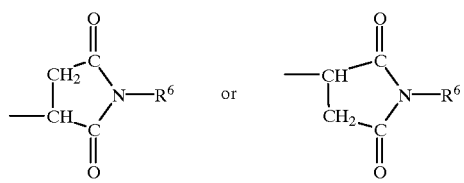

wherein $R^6$ is a hydrogen atom or a $C_1$ to $C_{25}$ hydrocarbon group which may contain an oxygen atom, nitrogen atom, and/or silicon atom, preferably a long-chain alkyl group such as a stearyl group.

It has been found that, by compounding into the rubber composition, a modified polybutene(polyisobutylene) containing this structure in the polymer, the affinity with the filler is improved and, at the same time, the reinforcement effect is improved due to the so-called pseudo cross-linking effect of the hydrogen bond and the viscoelastic properties and the abrasion resistance are improved.

The modified polybutene(polyisobutylene) having the structures (A) to (D) in the polymer thereof are based upon the polymers having at least one isobutylene as a monomer. Examples of such a polymer are polyisobutylene, polybutene, butyl rubber, brominated butyl rubber, isobutylene-maleic anhydride copolymer, isobutylene-p-methyl styrene-p-bromomethyl styrene copolymer, etc. The raft molecular weight thereof is not particularly limited, but in general a weight average molecular weight of 1000 to 1,000,000 is preferable. In the present invention, as shown in the Production Examples below, it is possible to modify the basic polymer by the reactive thereof with a suitable reaction agent.

According to the second aspect of the present invention, there is provided a rubber composition containing (i) 100 parts by weight of at least one starting diene rubber, (ii) at least 10 parts by weight, preferably 15 to 100 parts by weight, of at least one filler, and (iii) 0.1 to 80 parts by weight, preferably 1 to 30 parts by weight, of a modified polybutene(polyisobutylene). This rubber composition can increase the tan δ at 0° C. and decrease the tan δ at 60° C., without substantially affecting the abrasion resistance. If the content of the filler is too small, bleeding of the filler and modified polybutene is caused and, further, the mechanical properties of the rubber composition per se become poor. Further, if the content of the modified polybutene (polyisobutylene) is too small, the desired effect is not obtained. Contrary to this, if too large, the mixability and rollability become worse and tack remains after the vulcanization.

According to the second aspect of the present invention, there is further provided a rubber composition comprising (i) 100 parts by weight of at least one type of diene-based rubber, (ii) at least 10 parts by weight, preferably 15 to 100 parts by weight, of at least one type of filler, (iii) 0.1 to 80 parts by weight, preferably 1 to 30 parts by weight, of at least one modified polybutene(polyisobutylene), and (iv) 0.1 to 80 parts by weight, preferably 1 to 30 parts by weight, of (a) a polybutene(polyisobutylene) containing isobutylene as repeating units and modified with an acid anhydride group and/or (b) a modified polybutene(polyisobutylene) containing isobutylene as repeating units and having in A the polymer thereof at least one free radical selected from the group consisting of nitroxide radicals, hydrazyl radicals, aryloxy radicals, and trityl radicals stably present at a room temperature and in the presence of oxygen. This rubber composition also similarly improves the affinity with the filler and, at the same time, improves the reinforcement and is excellent in viscoelastic properties.

Also, in this composition, if the content of the filler is too small, bleeding of the modified polybutene is caused and, further, the mechanical properties of the rubber composition per se become poor. Further, if the content of the modified polybutene(polyisobutylene) (iii) is too small, the desired effect cannot be obtained. Conversely, if too large, the mixability and rollability become worse and tack remains after the vulcanization. Further, if the content of the modified polybutene(polyisobutylene) (iv) is too small, the desired effect cannot be obtained, whereas conversely if too large, the mixability and rollability become worse and tack remains after the vulcanization.

The modified polybutene(polyisobutylene) having, in the polymer having isobutylene as repeating units used in the present invention, preferably at the chain ends, nitroxide radicals, hydrazyl radicals, aryloxy radicals, and trityl radicals stably present at a room temperature and in the presence of oxygen can be obtained, as shown in, for example, the Production Examples below, can be obtained by the reaction between a polymer having isobutylene as repeating units and a compound having the free radicals. In the reaction, it is preferable to react the polymer having the isobutylene as repeating units with the free radical compound at a desired position, for example, the ends of the polymer chain, and modify the same with any reactive group so as to cause the bonding of the free radicals. Example of the reactive group are an alkoxysilyl group, acid anhydride group, ester group, etc. These reactions may be appropriately determined by a person skilled in the art. Further, the reaction conditions are not particularly limited either.

The polybutene(polyisobutylene) modified with the acid anhydride group, are those mainly composed of a maleic anhydride-modified polybutene having the formulae (V) to (VIII):

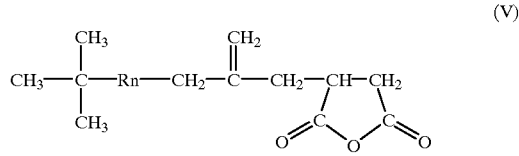

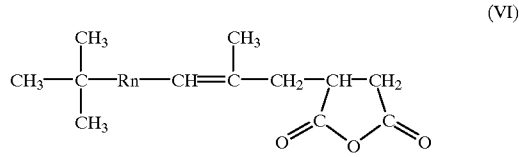

-continued

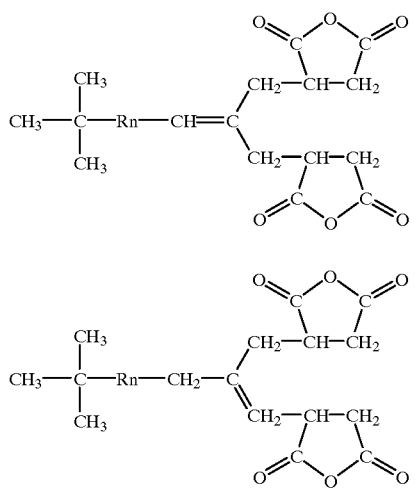

wherein R is a $C_4$ hydrocarbon fraction and n is an integer of 1 to 1000.

The term "polybutene" used herein means a compound produced by polymerizing a $C_4$ hydrocarbon fraction obtained from the cracking of naphtha etc. and containing isobutylene, 1,2-butene, 2,3-butene, etc. in the presence of a catalyst such as boron trifluoride or aluminum chloride. Those having the hydrogenated double bonds in the polybutene may also be used. The R in the formulae (V) to (VIII) preferably is mainly composed of —CH$_2$—C(CH$_3$)$_2$— and contains a small amount of —CH$_2$—CH(C$_2$H$_5$)— or —CH (CH$_3$)—CH(CH$_3$)— etc.

The maleic anhydride units having formulae (V) to (VIII) may be introduced by a conventional method, for example, the reaction between the end of olefin and the maleic anhydride, whereby the maleic anhydride unit is introduced into polyisobutylene by an Ene reaction under heating and stirring conditions. When the acid anhydride-modified polybutene thus obtained is compounded., the maleic anhydride units react with, for example, the hydroxy groups or carbonyl groups etc. on the carbon black to thereby bond with the carbon black. On the other hand, the isobutylene units improve the tan δ balance (and abrasion resistance). If the content of the acid anhydride modified polybutene is too small, the desired effect cannot be obtained, whereas if too large, the mixability and rollability become worse and tack remains after the vulcanization.

The starting rubber used, as the main component, in the rubber composition according to the present invention is any diene rubber generally used in various rubber compositions in the past. For example, natural rubber (NR), polyisoprene rubber (IR), various styrene-butadiene copolymer rubbers (SBR), various polybutadiene rubbers (BR), acrylonitrile-butadiene copolymer rubbers (NBR), butyl rubber (IRI), and other diene-based rubbers may be used alone or in any blends thereof.

The rubber composition according to the present invention further contains a general filler. Examples of such a filler are carbon black, silica, etc. At least 10 parts by weight, preferably 15 to 100 parts by weight, more preferably 30 to 70 parts by weight, of the filler are compounded into 100 parts by weight of the diene rubber. If the content of the filler is too small, the reinforcement required for the rubber composition cannot be obtained.

The isobutylene-based polymer according to the present invention may also be used mixed into the rubber after first reacting with the filler such as the carbon black or silica (bulk or solution).

When blending silica into the rubber composition according to the present invention, like in the past, for example, it is possible to blend in 5 to 30% by weight of a silane coupling agent with respect to the content of the silica. Further, in this case, it is possible to blend a silanol condensation catalyst in an amount of 0.05 to 50% by weight of the content of the silane coupling agent. As the silane coupling agent used for the silica-containing rubber composition according to the present invention, it is possible to use any silane coupling agent used as a silica filler in the past.

As typical examples, vinyl trimethoxysilane, vinyl triethoxysilane, vinyl tris(2-methoxyethoxy)silane, N-(2-aminoethyl)3-aminopropylmethyl dimethoxysilane, N-(2-aminoethyl)3-aminopropyl trimethoxysilane, 3-aminopropyl triethoxysilane, 3-glycidoxypropyl trimethoxysilane, 3-glycidoxypropylmethyl dimethoxysilane, 2-(3,4-epoxycyclohexyl)ethyl trimethoxysilane, 3-methacryloxypropyl trimethoxysilane, 3-mercaptopropyl trimethoxysilane, 3-aminopropyl trimethoxysilane, bis-[3-(triethoxysilyl)-propyl]tetrasulfide, etc. may be mentioned. Among these, bis-[3-(triethoxysilyl)-propyl]tetrasulfide is most preferred from the standpoint of the processability.

The rubber composition according to the present invention may contain thereof, in addition to the above essential ingredients, various additives generally mixed in for tire use or other general rubber use such as vulcanization or cross-linking agents, vulcanization or cross-linking accelerators, various types of oils, antioxidants, and plasticizers. The mixture may be kneaded and vulcanized by a general method to produce the composition which may in turn be used for the vulcanization or cross-linking. The contents of the additives may be made the general contents of the prior art in so far as the objects of the present invention are not impaired.

The rubber composition according to the present invention may be used not only for tires, but also for belts, hoses, rubber shock absorbers, rollers, sheet linings, rubberized cloth, seal materials, gloves, fenders, and the like.

The rubber composition according to the third aspect of the present invention is suitable for use as a tire tread and contains, as essential ingredients, a diene rubber, a filler for rubber, and acid anhydride-modified polybutene.

The rubbers compounded into the rubber composition according to the third aspect of the present invention are diene rubber generally used in rubber compositions in the past, in particular, those for tires. Specifically, for example, natural rubber (NR), various butadiene rubbers (BR), various styrene-butadiene copolymer rubbers (SBR), polyisoprene rubber (IR), butyl rubber (IRI), acrylonitrile butadiene rubbers, styrene-isoprene copolymer rubbers, styrene-isoprene-butadiene copolymer rubbers, isoprene-butadiene copolymer rubbers, etc. may be used. These may be used alone or in any blends thereof.

The rubber composition of the present invention contains, as a filler, any carbon black and/or silica normally compounded into rubber compositions. The silica may be a wet type or dry type silica or surface treated silica etc. and is not particularly limited. Even a silica with silanol groups remaining may be used. Further, even carbon black deposited with silica on the surface thereof may be used. The content of the rubber filler is at least 20 parts by weight, preferably 20 to 120 parts by weight, more preferably 40 to 100 parts by weight, based upon 100 parts by weight of the rubber. Silica may also be used as the rubber filler in combination.

The carbon black used in the third aspect of the present invention preferably has a nitrogen specific area ($N_2SA$) of 10 to 200 m$^2$/g and a dibutyl phthalate absorption (DBP) of 50 to 200 cc/100 g, more preferably an $N_2SA$ of 130 to 200 m$^2$/g and a DBP of 100 to 150 cc/100 g. The silica preferably has a specific area of 80 to 330 m$^2$/g and a DBP of 110 to 300 cc/100 g, more preferably a specific area of 150 to 250 m$^2$/g and a DBP of 180 to 250 cc/100 g.

The polybutene modified with maleic anhydride used in the third aspect of the present invention is a polybutene containing at least 50 mol % of isobutylene unit and having alkenyl groups and typically is polyisobutylene or a polymer containing isobutylene unit as a main component. The polybutene is a polymer obtained by polymerization of the $C_4$ fraction obtained in the petrochemical field (normally approximately 90% isobutylene and the remainder 1,2-butene, 2,3-butene, etc.) The polybutene obtained from this polymerization may be used in the present invention for the maleic anhydride modification.

In the present invention, the above-mentioned acid anhydride-modified polybutene is compounded in an amount of 3 to 80 parts by weight, preferably 10 to 50 parts by weight, more preferably 15 to 40 parts by weight, based upon 100 parts by weight of the rubber. If the content is too small, the softening effect is not notably manifested, while conversely if too large, time is required for the kneading at the time of processing and the processability tends to be decreased such as a worse roll release.

The rubber composition of the present invention, as explained above, has the polybutene containing the at least 50 mol % of isobutylene unit and having alkenyl groups compound into the composition at the time of compounding the acid anhydride-modified polybutene and the rubber. Typically, an acid anhydride-modified polybutene containing, as a main component, the maleic anhydride-modified polyisobutylene shown by formulae (V) to (VIII), (wherein n is an integer of 1 to 1000 in the formulae (V) to (VIII)) (known polybutene has a number average molecular weight of 200 to 20000) is mixed in.

When mixing the silica into the rubber composition according to the present invention, in the same way as in the prior art, for example, it is possible to use a silane coupling agent in an amount of 5 to 30% by weight of the content of silica. Further, in this case, it is possible to mix a silanol condensation catalyst in an amount of 0.05 to 50% by weight of the content of the silane coupling agent. As the silane coupling agent usable for the silica-containing rubber composition according to the present invention, it is possible to select any silane coupling agent optionally used as a silica filler in the past. As typical examples, vinyl trimethoxysilane, vinyl triethoxysilane, vinyl tris(2-methoxyethoxy)silane, N-(2-aminoethyl)3-aminopropylmethyl dimethoxysilane, N-(2-aminoethyl)3-aminopropyl trimethoxysilane, 3-aminopropyl triethoxysilane, 3-glycidoxypropyl trimethoxysilane, 3-glycidoxypropylmethyl dimethoxysilane, 2-(3,4-epoxycyclohexyl)ethyl trimethoxysilane, 3-methacryloxypropyl trimethoxysilane, 3-mercaptopropyl trimethoxysilane, 3-aminopropyl trimethoxysilane, bis-[3-(triethoxysilyl)-propyl]tetrasulfide, etc. may be mentioned. Among these, bis-[3-(triethoxysilyl)-propyl]tetrasulfide is most preferred from the standpoint of the processability.

The rubber composition according to the third aspect of the present invention may also contain therein various additives generally mixed in for other general rubber use such as vulcanization or cross-linking agents, vulcanization or cross-linking accelerators, various types of oils, antioxidants, fillers, plasticizers, and softening agents. The mixture may be kneaded and vulcanized by a general method to produce the composition which may in turn be used for the vulcanization or cross-linking. The contents of the additives may be made the general contents of the prior art in so far as the objects of the present invention are not impaired.

The rubber composition according to the present invention may be used not only for tires, but also for belts, hoses, rubber shock absorbers, rollers, sheet linings, rubberized cloth, seal materials, gloves, fenders, and the like.

According to the fourth aspect of the present invention, the alkoxysilane is introduced at the end of the polymer chain or in the chain of the polyisobutylene, the reinforcement effect with a filler can be improved and, at the same time, it has been found that the moiety capable of forming a hydrogen bond in the molecule (i.e., "hydrogen bondable moiety) (e.g., carboxylic acid, amide, ester, hydroxy group, amino group) is introduced in the polymer, whereby the reinforcement effect is improved due to the so-called pseudo crosslinking between the rubber molecules and the viscoelastic properties and abrasion resistance are improved.

The preferred embodiments according to the fourth aspect of the present invention are as follows:

(1) A polymer comprising isobutylene, as at least one monomer, and having an alkoxysilane and at least one hydrogen bondable moiety selected from the group consisting of a carboxylic acid, amide, ester, hydroxyl group and amino group in the polymer thereof.

(2) A polymer comprising isobutylene, as at least one monomer, and having an alkoxysilane, carboxylic acid and amide in the molecule thereof.

(3) A polymer comprising isobutylene, as at least one monomer, and having the structure, in, or at the end of, the molecule thereof, of the formula (IX):

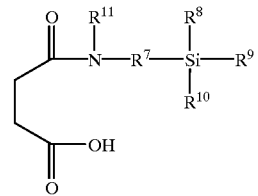

(IX)

wherein $R^7$, $R^8$, $R^9$ and $R^{10}$ may be the same or different, $R^7$ is a $C_1$–$C_{18}$ hydrocarbon group, $R^9$, $R^{10}$ and $R^{11}$ are a $C_1$–$C_{18}$ hydrocarbon group or a $C_1$–$C_{18}$ alkoxy group and $R^{11}$ is a hydrogen atom or a $C_1$–$C_{18}$ hydrocarbon group.

(4) A rubber composition comprising at least one polymer mentioned above.

As a polymer having isobutylene as at least one monomer usable in the fourth aspect of the present invention, polyisobutylene, polybutene, butyl rubber, brominated butyl rubber, isobutylene-maleic anhydride copolymer, isobutylene-p-methyl styrene-p-bromomethyl styrene copolymer, etc. may be mentioned. These may be used alone or in any mixture thereof.

The modified polybutene(polyisobutylene) according to the present invention are those obtained by introducing a compounds having an alkoxysilane and the hydrogen bondable group such as carboxylic acid, amide, ester, hydroxyl group and amino group to the end or the inside of the polymer containing isobutylene as at least one monomer as mentioned above by a well-known method in this art.

Typical examples of the modified polybutene (polyisbbutylene) are those having the following structures in the main unit thereof.

1)
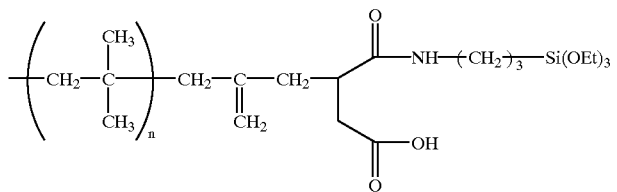
2)
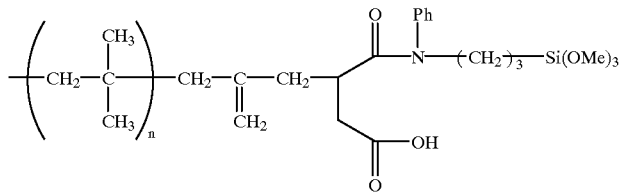
3)
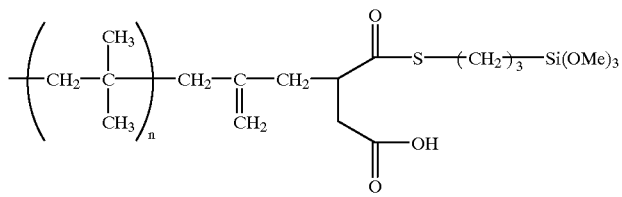
4)
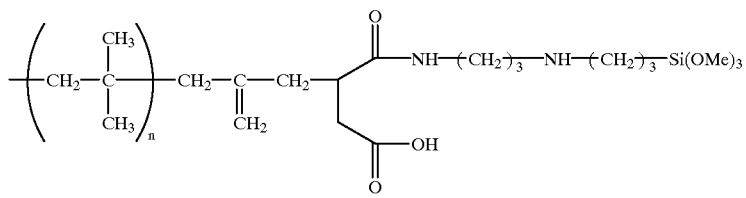
5)
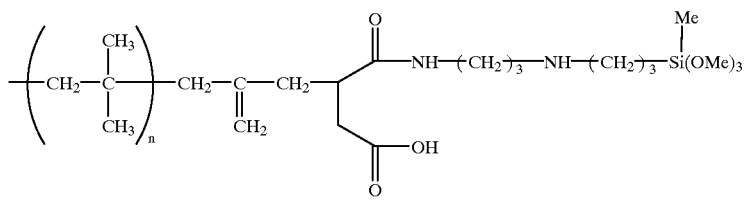
6)
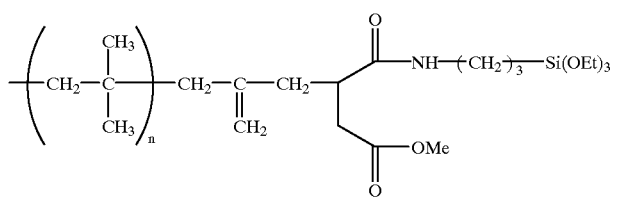
7)
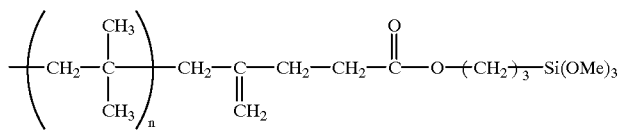
8)
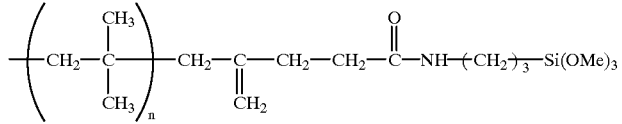

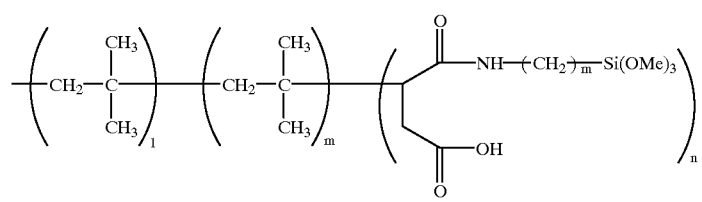
9)
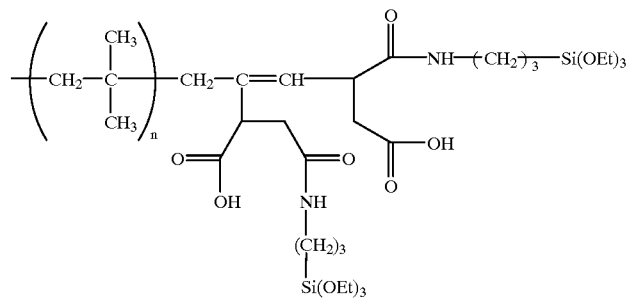
10)
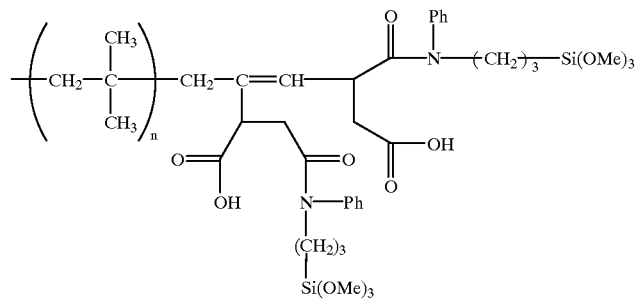
11)
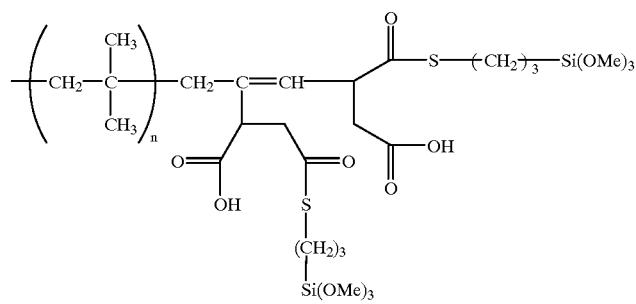
12)
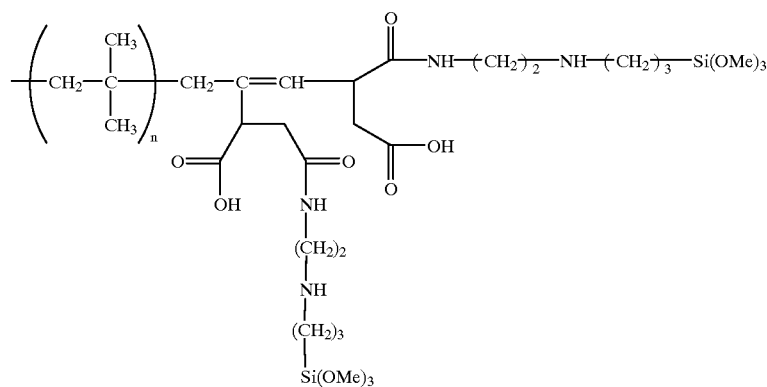
13)

-continued
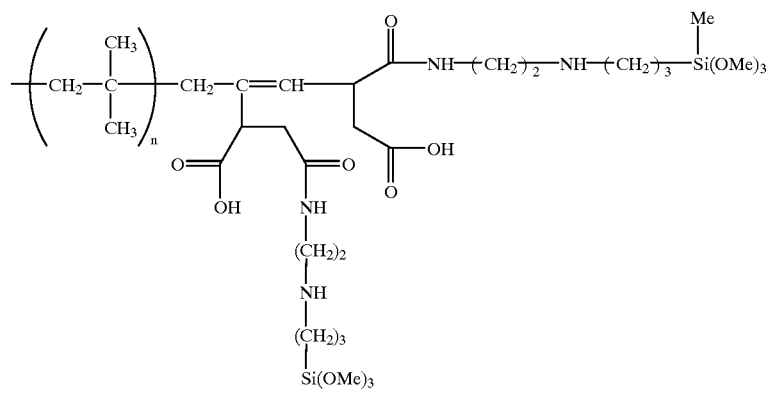
14)
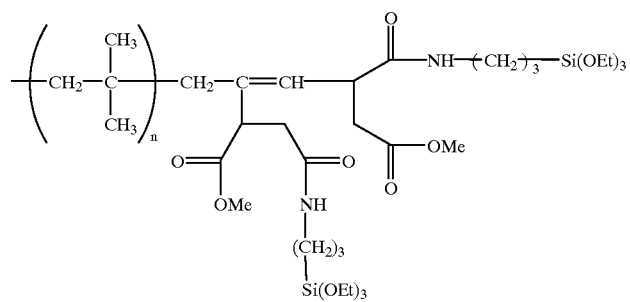
15)
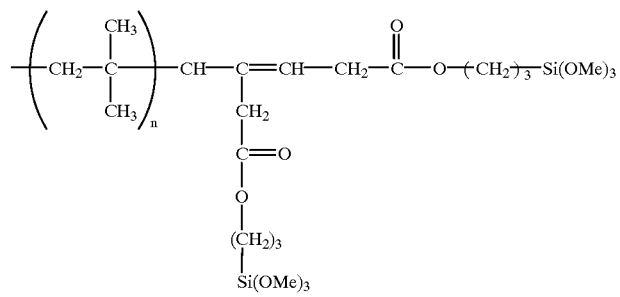
16)
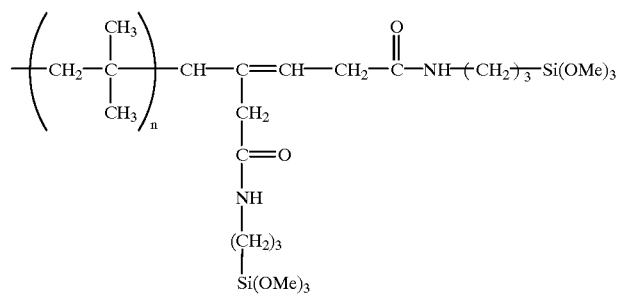
17)

-continued
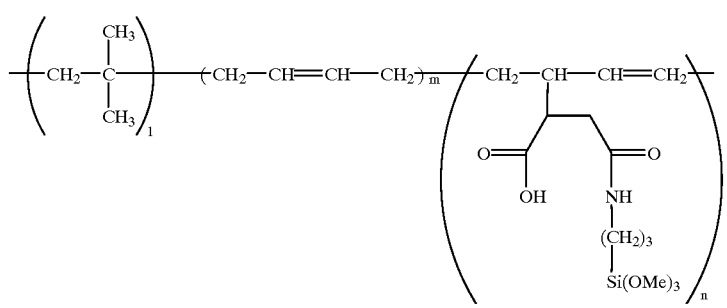
18)
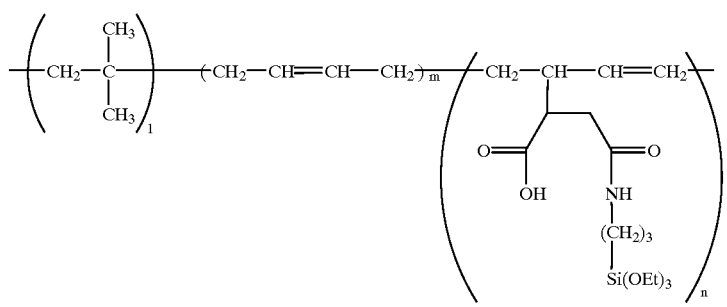
19)
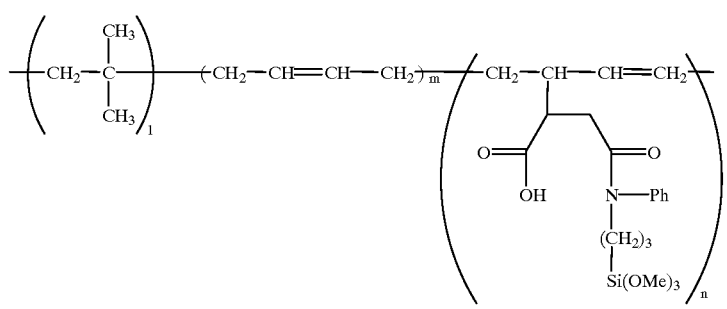
20)
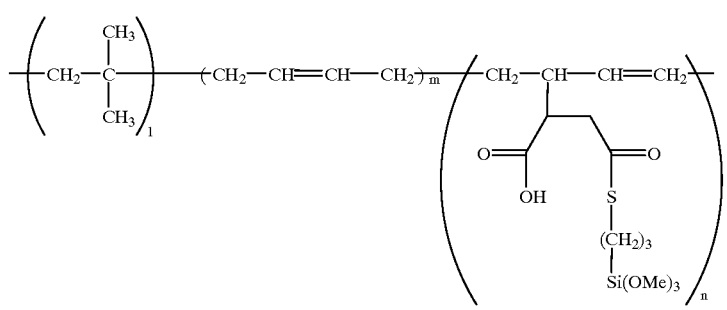
21)
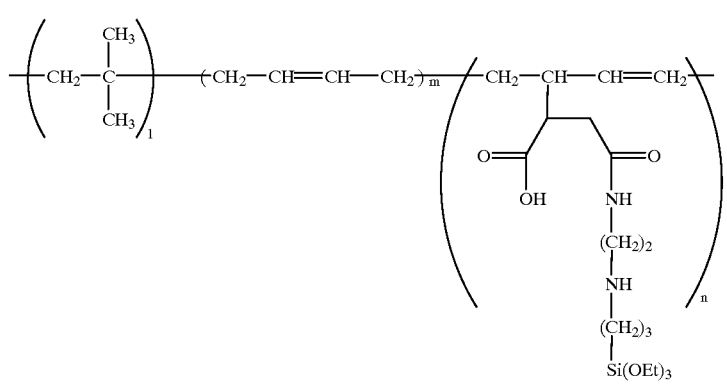
22)

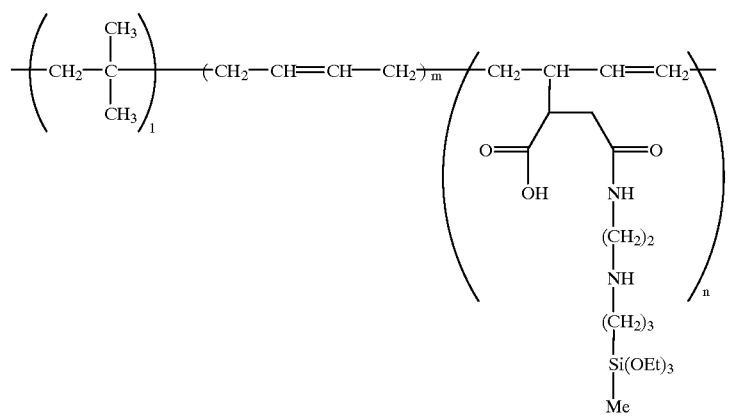
23)
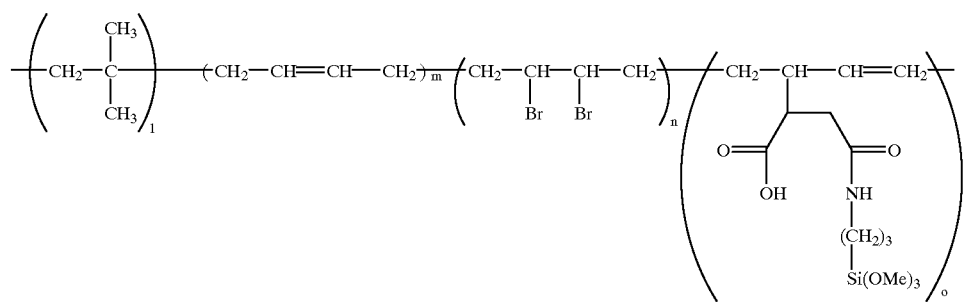
24)
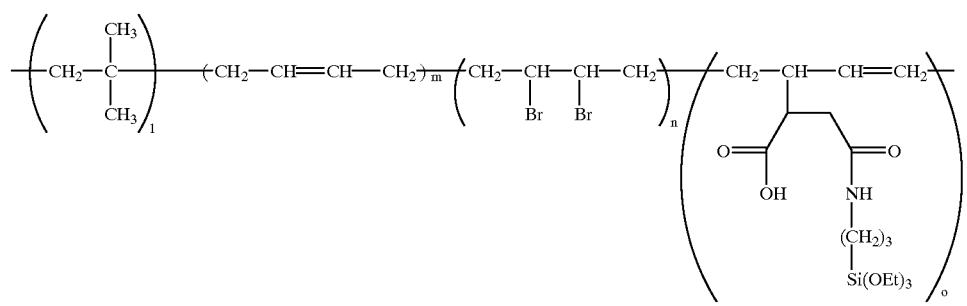
25)
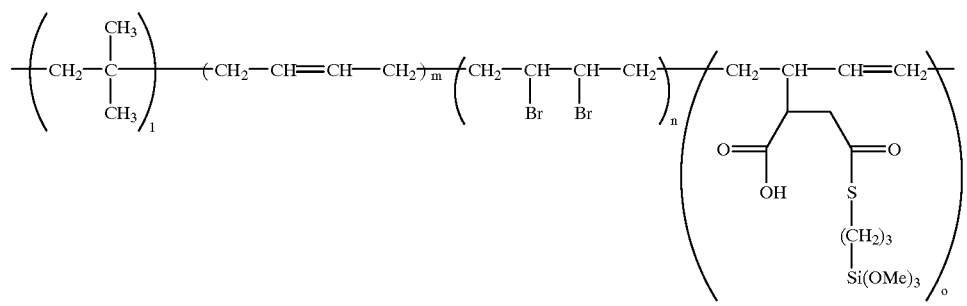
26)

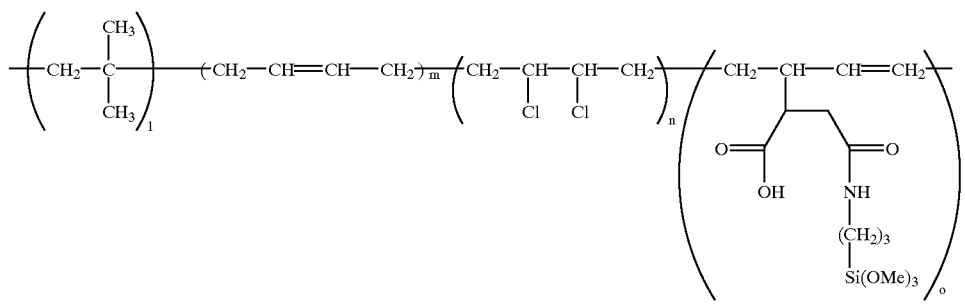
27)
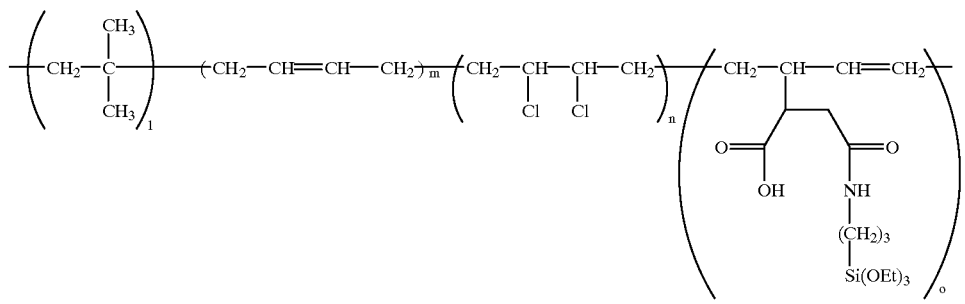
28)
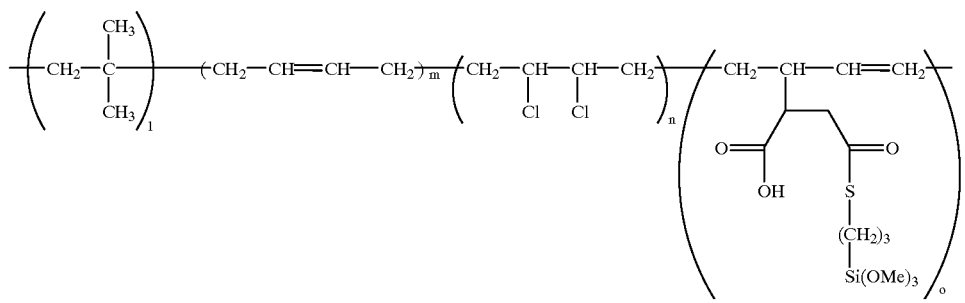
29)
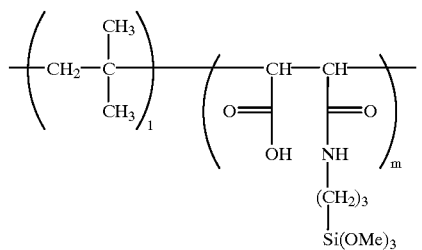
30)
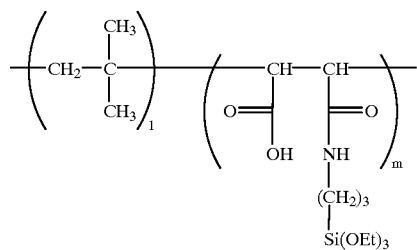
31)
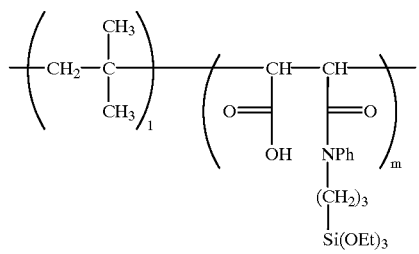
32)
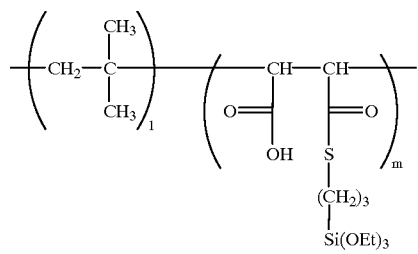
33)

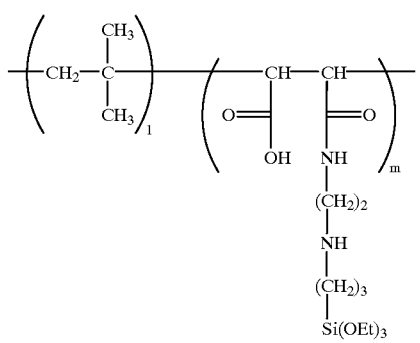

34)

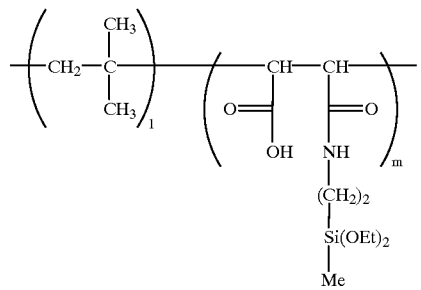

35)

In the above formulae, Et is —$C_2H_5$ (i.e., ethyl group), Me is —$CH_3$ (i.e., methyl group), Ph is —$C_6H_5$ (i.e., phenyl group).

The modified polybutene(polyisobutylene) according to the present invention is compounded into 100 parts by weight of a rubber generally used as a rubber composition in the past, especially, a starting diene rubber, in an amount of 0.1 to 100 parts by weight, preferably 1 to 50 parts by weight. If the content is too small, there is a tendency exhibiting no noticeable intended effect, whereas if too large, the tan δ balance and the abrasion resistance are undesirably decreased.

The rubbers compounded into the rubber composition according to the present invention are diene rubber generally used in rubber compositions in the past. Specifically, for example, natural rubber (NR), various butadiene rubbers (BR), various styrene-butadiene copolymer rubbers (SBR), polyisoprene rubber (IR), butyl rubber (IRI), acrylonitrile butadiene rubbers, styrene-isoprene copolymer rubbers, styrene-isoprene-butadiene copolymer rubbers, isoprene-butadiene copolymer rubbers, etc. may be used. These may be used alone or in any blends thereof.

The rubber composition of the present invention contains, as a filler, any carbon black and/or silica normally compounded into rubber compositions. The content of the rubber filler is at least 10 parts by weight, preferably 15 to 120 parts by weight, based upon 100 parts by weight of the rubber. When the content of the rubber filler is too small, the necessary reinforcement effect for the rubber composition cannot be obtained.

When mixing the silica into the rubber composition according to the present invention, in the same way as in the prior art, for example, it is possible to use a silane coupling agent in an amount of 5 to 30% by weight of the content of silica. Further, in this case, it is possible to mix a silanol condensation catalyst in an amount of 0.05 to 50% by weight of the content of the silane coupling agent. As the silane coupling agent usable for the silica-containing rubber composition according to the present invention, it is possible to select any silane coupling agent optionally used as a silica filler in the past. As typical examples, vinyl trimethoxysilane, vinyl triethoxysilane, vinyl tris(2-methoxyethoxy)silane, N-(2-aminoethyl)3-aminopropylmethyl dimethoxysilane, N-(2-aminoethyl)3-aminopropyl trimethoxysilane, 3-aminopropyl triethoxysilane, 3-glycidoxypropyl trimethoxysilane, 3-glycidoxypropylmethyl dimethoxysilane, 2-(3,4-epoxycyclohexyl)ethyl trimethoxysilane, 3-methacryloxypropyl trimethoxysilane, 3-mercaptopropyl trimethoxysilane, 3-aminopropyl trimethoxysilane, bis-[3-(triethoxysilyl)-propyl]tetrasulfide, etc. may be mentioned. Among these, bis-[3-(triethoxysilyl)-propyl]tetrasulfide is most preferred from the standpoint of the processability.

The rubber composition according to the present invention may also contain therein various additives generally mixed in for other general rubber use such as vulcanization or cross-linking agents, vulcanization or cross-linking accelerators, various types of oils, antioxidants, fillers, plasticizers, and softening agents. The mixture may be kneaded and vulcanized by a general method to produce the composition which may in turn be used for the vulcanization or cross-linking. The contents of the additives may be made the general contents of the prior art in so far as the objects of the present invention are not impaired.

The rubber composition according to the present invention may be used not only for tires, but also for belts, hoses, rubber shock absorbers, rollers, sheet linings, rubberized fabric, seal materials, gloves, fenders, and the like.

EXAMPLES

The present invention will now be further illustrated by, but is by no means limited to, the following Production Examples, Examples, and Comparative Examples.

Production Examples 1, Examples I, and Comparative Examples I

The compounds used in the following Production Examples were as follows:

1) 4-hydroxy-TEMPO (tetramethylpiperidinyloxy): made by Asahi Denka Kogyo K.K. (Japan)
2) Alkoxysilyl-terminated polyisobutylene: Kaneka EP303S (number average molecular weight 10,000) made by Kanegafuchi Kagaku K.K. (Japan)
3) Maleated polybutene: made by Nihon Petrochemicals Co. (Japan)
4) Isobutylene-p-methyl styrene-p-bromomethyl styrene copolymer: made by Exxon Chemical

Production Example I-1

400 g of an alkoxysilyl-terminated polyisobutylene (Kaneka EP303S (number average molecular weight 10,000)) (including 92.3 g of plasticizer), 10.58 g (0.0615 mol) of 4-hydroxy-TEMPO, and 0.524 g (1.845 mol) of tetraisopropoxy titane (Ti(Oi-Pr)$_4$) were heated and stirred under vacuum at 120° C. for 12 hours to give EPION-TEMPO by the following reaction. The reaction was confirmed by NMR analysis whereupon a decrease in the peak of the methyl groups of the alkoxysilane of 0.1 ppm and a peak of TEMPO of about 7.2 ppm were confirmed.

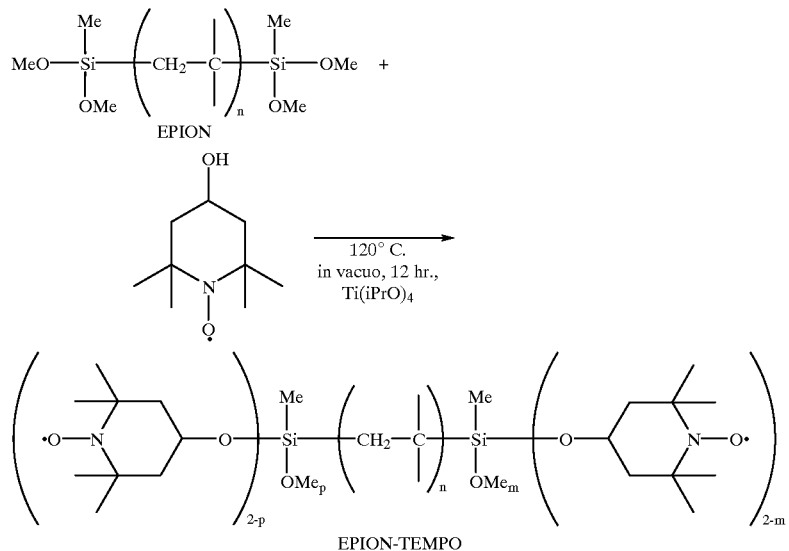

wherein, p is an integer of 0 to 2, m is an integer of 0 to 2, and n is any integer.

Production Example I-2

100 g of maleated polybutene (number average molecular weight of 2,900, maleation ratio: 70%) and 4.81 g (0.0243 mol) of 4-hydroxy-TEMPO were heated and stirred at 120° C. for 12 hours to give MPIB-TEMPO by the following reaction. The reaction was confirmed by IR. It was confirmed that the absorption of the carbonyl of the acid anhydride of 1715 cm$^{-1}$ shifted to 1738 cm$^{-1}$ due to the esterification by the ring opening.

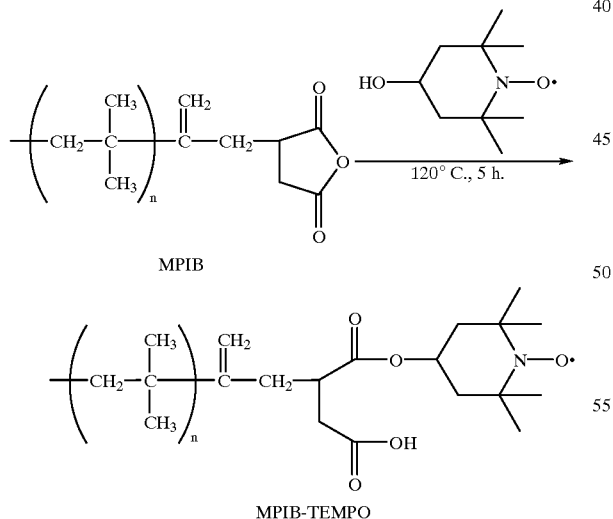

Production Example I-3

477.7 g of isobutylene-p-methylstyrene-p-bromomethylstyrene copolymer (Exxpro 90-10) was kneaded by a pressure type kneader for 10 minutes, then 19.4 g (0.0243 mol) of a sodium salt of 4-hydroxy-TEMPO was added and further kneaded at 100 to 120° C. for 1 hour to give Exxpro-TEMPO by the following reaction.

Note that the reaction similarly proceeds even with bed 20 brominated butyl rubber and chlorinated butyl rubber. The reaction was confirmed by NMR and it was confirmed that the methine peak around 4.4 ppm disappeared.

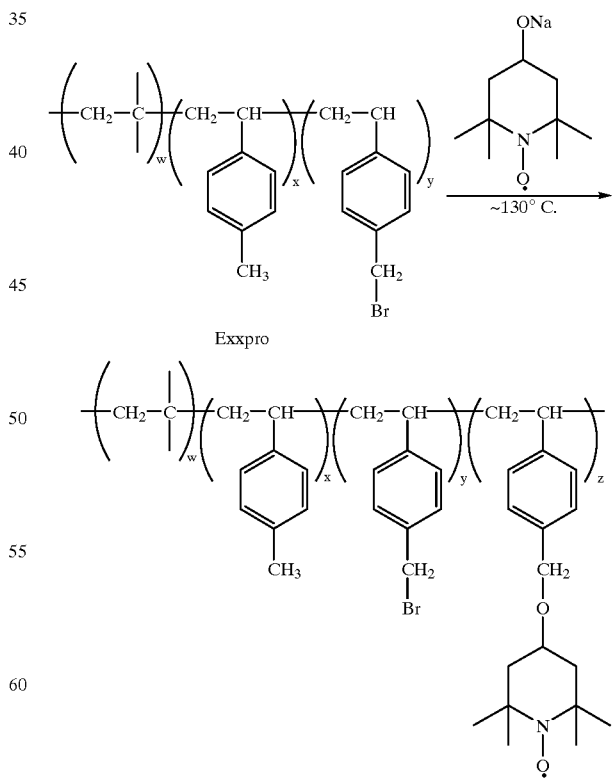

Examples I-1 to I-2 and Comparative Examples I-1 to I-5

In each of the formulations (parts by weight) shown in Table I-1, the ingredients other than the vulcanization accelerator and sulfur were kneaded by a 1.8 liter internal mixer for 3 to 5 minutes. The vulcanization accelerator and sulfur were kneaded by an 8-inch open roll into the master batch discharged when the temperature reached 165±5° C. to obtain a rubber composition. The unvulcanized properties of the rubber composition obtained were measured.

Next, the composition was vulcanized by being pressed in a 15×15×0.2 cm mold at 160° C. for 20 minutes to prepare the intended test piece (rubber sheet) which was then used to evaluate the vulcanized properties.

3) Lambourn abrasion

Each of the various rubber compositions obtained was measured for lambourn abrasion based on JIS K6264. This was performed at a load of 1.5 kg and a slip rate of 50%. The results are shown as relative values indexed to the value of the abrasion resistance index of Comparative Example I-1 as 100.

As explained above, each of the rubber compositions comprising isobutylene containing in the molecule free radicals stable at ordinary temperature and under the presence of oxygen according to the present invention increases the tan δ (0° C.) and reduces the tan δ (60° C.) without substantially reducing the abrasion resistance, so the wet braking performance of the tire is improved and the fuel economy improved, making this useful as a rubber composition for a tire.

TABLE I-1

|  | Comp. Ex. | | | | | Ex. | |
| --- | --- | --- | --- | --- | --- | --- | --- |
|  | I-1 | I-2 | I-3 | I-4 | I-5 | I-1 | I-2 |
| Formulation (parts by weight) | | | | | | | |
| SBR*1 | 100.0 | 100.0 | 100.0 | 100.0 | 100.0 | 100.0 | 100.0 |
| Carbon black | 50.0 | 50.0 | 50.0 | 50.0 | 50.0 | 50.0 | 50.0 |
| Zinc oxide | 3.0 | 3.0 | 3.0 | 3.0 | 3.0 | 3.0 | 3.0 |
| Stearic acid | 1.0 | 1.0 | 1.0 | 1.0 | 1.0 | 1.0 | 1.0 |
| Antioxidant*2 | 2.0 | 2.0 | 2.0 | 2.0 | 2.0 | 2.0 | 2.0 |
| Aromatic oil | — | 3.0 | 8.0 | — | — | — | — |
| EPION*3 | — | — | — | 3.0 | 8.0 | — | — |
| EPION-TEMPO*4 | — | — | — | — | — | 3.0 | 8.0 |
| Sulfur | 2.1 | 2.1 | 2.1 | 2.1 | 2.1 | 2.1 | 2.1 |
| Vulcanization accelerator*5 | 1.0 | 1.0 | 1.0 | 1.0 | 1.0 | 1.0 | 1.0 |
| (Total weight) | 159.1 | 162.1 | 167.1 | 162.1 | 167.1 | 162.1 | 167.1 |
| Physical properties | | | | | | | |
| Mooney viscosity | | | | | | | |
| Initial torque | 146.6 | 128.2 | 112.2 | 133.2 | 128.0 | 134.0 | 114.8 |
| $ML_{1+4}$ (100° C.) | 85.2 | 79.2 | 67.6 | 79.8 | 75.0 | 82.4 | 73.6 |
| Lupke JIS hardness (20° C.) | 71.8 | 69.6 | 66.6 | 70 | 68 | 69 | 66.4 |
| tan δ (0° C.) | 0.277 | 0.276 | 0.297 | 0.274 | 0.281 | 0.278 | 0.282 |
| tan δ (60° C.) | 0.162 | 0.164 | 0.181 | 0.161 | 0.164 | 0.156 | 0.155 |
| Lambourn abrasion (index) | 100 | 94.4 | 86.3 | 96.3 | 100.5 | 99.1 | 98.8 |

*1: Emulsion polymerized SBR Nipol 1502 made by Nippon Zeon K.K. (Japan) (styrene content 22.5%)
*2: Noclac 6C made by Ouchi Shinko Kagaku K.K. (Japan)
*3: Alkoxysilyl-terminated polyisobutylene (made by Kanegafuchi Kagaku K.K. (Japan, Kaneka EP303S, number average molecular weight 10,000)
*4: Product of Production Example I-1
*5: Noccelar CZ-G made by Ouchi Shinko Kagaku K.K. (Japan)

The methods of measurement of the physical properties evaluated were as follows:

1) Mooney viscosity ($ML_{1+4}$)

The pre-cross-linked mixture was tested by a Mooney viscometer in accordance with JIS K6300 to measure the Mooney viscosity. The measurement was made using an L-rotor under conditions of a preheating time of 1 minute, a rotor rotation time of 4 minutes, and a temperature of 100° C.

2) tan δ (0° C. and 60° C.)

Rheolographsolid manufactured by Toyo Seiki Seisakusho (Japan) was used under the conditions of an initial strain of 10%, a dynamic strain of 2% and a frequency 20 Hz (sample width: 5 mm) at 0° C. or 60° C. according to a method of JIS H7002.

Examples II and Comparative Examples II

The following commercially available products were used for the formulation ingredients shown in the tables used for the formulations of the following Examples and Comparative Examples except for the modified polybutene. The methods of measurement of the physical properties are also shown below.

SBR: Nipol 1502 (made by Nippon Zeon K.K., Japan)
Carbon black: HAF Shoblack N339 (Showa Cabot K.K., Japan)
Silica: Nipsil AQ (made by Nihon Silica Kogyo K.K., Japan)
Silane coupling agent: Si69 (made by Degussa)
Zinc oxide: Ginrei Zinc White R (made by Toho Aen K.K., Japan)

Stearic acid: Beads Stearic Acid Kiri (made by Nihon Yushi K.K., Japan)

Antioxidant: N-phenyl-N'-(1,3-dimethylbutyl)-p-phenylene diamine

Sulfur: Oil-treated sulfur (made by Karuizawa Seirensho, Japan)

Vulcanization accelerator CZ: Noccelar CZ-G (made by Ouchi Shinko Kagaku K.K. Japan)

Vulcanization accelerator DPG: Noccelar D (made by Ouchi Shinko Kagaku K.K. Japan)

Aromatic oil: Desolex No. 3 (made by Showa Shell Sekiyu K.K. Japan)

tan δ (0° C. and 60° C.)

Rheolographsolid manufactured by Toyo Seiki Seisakusho (Japan) was used under the conditions of an initial strain of 10%, a dynamic strain of 2% and a frequency 20 Hz (sample width: 5 mm) at 0° C. or 60° C. according to a method of JIS H7002.

Abrasion resistance (index): 2-series Lambourn test (slip rate 25%, load 5 kg, time 4 minutes, temperature RT, K-80 grindstone). Note that the results are shown indexed to the value of Comparative Example II-1 as 100. The larger the value, the better the abrasion resistance shown.

Examples II-1 to II-4 and Comparative Examples II-1 to II-2

Synthesis of Modified Polybutene

First, 76.53 g of maleated polybutene (made by Nippon Petrochemicals, number average molecular weight of 2,900, maleation ratio: 70%) and 1.11 g (0.0185 mol) of propanol or 5.00 g (0.0185 mol) of stearyl alcohol were heated and stirred at 80° C. for 12 hours to make them react so as to give propyl half ester type polybutene (POH-PIB) or stearyl half ester type polybutene (SOH-PIB) (see following reaction formulas). The reaction products were subjected to IR analysis, whereupon it was confirmed that the absorption of carbonyl of 1715 $cm^{-1}$ shifted to 1738 $cm^{-1}$ and that the reaction was proceeding.

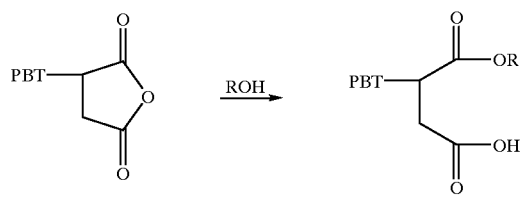

wherein R is $C_3H_7$ (POH-PIB) or $C_{18}H_{37}$ (SOH-PIB) and PBT indicates polybutene.

Preparation of Sample

The ingredients of each of the formulations shown in Table II-1 except for the vulcanization accelerator and sulfur were kneaded by a 1.8 liter internal mixer for 3 to 5 minutes. The vulcanization accelerator and sulfur were kneaded by an 8-inch open roll into the master batch discharged when the temperature reached 165±5° C. to obtain a rubber composition.

Next, the composition was vulcanized by being pressed in a 15×15×0.2 cm mold at 160° C. for 20 minutes to prepare the intended test piece (rubber sheet) which was then used to evaluate the vulcanized properties, that is, the 50% modulus, tan δ (0° C. and 60° C.), and abrasion resistance. The results are shown in Table II-1.

TABLE II-1

|  | Comp. Ex. II-1 | Ex. II-1 | Ex. II-2 | Comp. Ex. II-2 | Ex. II-3 | Ex. II-4 |
|---|---|---|---|---|---|---|
| Formulation (parts by weight) | | | | | | |
| SBR | 100.00 | 100.00 | 100.00 | 100.00 | 100.00 | 100.00 |
| Carbon HAF | 50.00 | 50.00 | 50.00 | — | — | — |
| Silica | — | — | — | 50.00 | 50.00 | 50.00 |
| Si69 | — | — | — | 6.00 | 6.00 | 6.00 |
| DEG | — | — | — | 2.00 | 2.00 | 2.00 |
| Zinc oxide | 3.00 | 3.00 | 3.00 | 3.00 | 3.00 | 3.00 |
| Stearic acid | 1.00 | 1.00 | 1.00 | 2.00 | 2.00 | 2.00 |
| Antioxidant | 2.00 | 2.00 | 2.00 | 2.00 | 2.00 | 2.00 |
| Aromatic oil | 10.00 | — | — | 10.00 | — | — |
| POH-PIB | — | 10.00 | — | — | 10.00 | — |
| SOH-PIB | — | — | 10.00 | — | — | 10.00 |
| Sulfur | 2.10 | 2.10 | 2.10 | 1.70 | 1.70 | 1.70 |
| Vulcanization accelerator CZ | 1.00 | 1.00 | 1.00 | 2.00 | 2.00 | 2.00 |
| Vulcanization accelerator DPG | — | — | — | 1.00 | 1.00 | 1.00 |
| (Total) | (169.10) | (169.10) | (169.10) | (204.70) | (204.70) | (204.70) |
| Elongation type viscoelasticity | | | | | | |
| tan δ (0° C.) | 0.306 | 0.346 | 0.344 | 0.309 | 0.330 | 0.343 |
| tan δ (60° C.) | 0.212 | 0.203 | 0.208 | 0.163 | 0.161 | 0.160 |
| Abrasion resistance (index) | 100 | 127 | 115 | 100 | 98 | 99 |

Examples II-5 to II-8 and Comparative Examples
II-3 to II-4

Synthesis of Modified Polybutene

First, 76.53 g of maleated polybutene (made by Nihon Sekiyu Kagaku K.K. Japan, number average molecular weight of 2,900, maleation ratio: 70%) and 1.153 g (0.0195 mol) of propylamine or 5.256 g (0.0195 mol) of stearylamine were heated and stirred at 80° C. for 12 hours to give propylamine type polybutene (PNH-PIB) (see following reaction formula) or stearylamine type polybutene SNH-PIB). The reaction products were subjected to IR analysis, whereupon it was confirmed that the absorption of carbonyl of 1715 cm$^{-1}$ shifted to 1712 cm$^{-1}$ and that the reaction was proceeding.

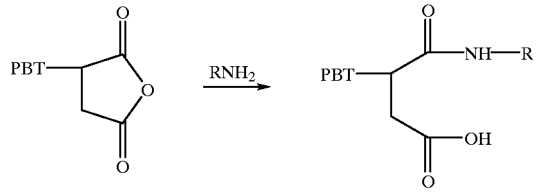

wherein R is $C_3H_7$ (PNH-PIB) or $C_{18}H_{37}$ (SNH-PIB) and PBT indicates polybutene.

Preparation of Sample

The ingredients of each of the formulations (parts by weight) shown in Table II-2 except for the vulcanization accelerator and sulfur were kneaded by a 1.8 liter internal mixer for 3 to 5 minutes. The vulcanization accelerator and sulfur were kneaded by an 8-inch open roll into the master batch, discharged when the temperature reached 165±5° C. to obtain a rubber composition.

Next, the composition was vulcanized by being pressed in a 15×15 0.2 cm mold at 160° C. for 20 minutes to prepare the intended test piece (rubber sheet) which was then used to evaluate the vulcanized properties, that is, the 50% modulus, tan δ (0° C. and 60° C.), and abrasion resistance. The results are shown in Table II-2.

TABLE II-2

| | Comp. Ex. II-3 | Ex. II-5 | Ex. II-6 | Comp. Ex. II-4 | Ex. II-7 | Ex. II-8 |
|---|---|---|---|---|---|---|
| Formulation (parts by weight) | | | | | | |
| SBR | 100.00 | 100.00 | 100.00 | 100.00 | 100.00 | 100.00 |
| Carbon HAF | 50.00 | 50.00 | 50.00 | — | — | — |
| Silica | — | — | — | 50.00 | 50.00 | 50.00 |
| Si69 | — | — | — | 6.00 | 6.00 | 6.00 |
| DEG | — | — | — | 2.00 | 2.00 | 2.00 |
| Zinc oxide | 3.00 | 3.00 | 3.00 | 3.00 | 3.00 | 3.00 |
| Stearic acid | 1.00 | 1.00 | 1.00 | 2.00 | 2.00 | 2.00 |
| Antioxidant | 2.00 | 2.00 | 2.00 | 2.00 | 2.00 | 2.00 |
| Aromatic oil | 10.00 | — | — | 10.00 | — | — |
| PNH-PIB | — | 10.00 | — | — | 10.00 | — |
| SNH-PIB | — | — | 10.00 | — | — | 10.00 |
| Sulfur | 2.10 | 2.10 | 2.10 | 1.70 | 1.70 | 1.70 |
| Vulcanization accelerator CZ | 1.00 | 1.00 | 1.00 | 2.00 | 2.00 | 2.00 |
| Vulcanization acclerator DPG | — | — | — | 1.00 | 1.00 | 1.00 |
| (Total) | (169.10) | (169.10) | (169.10) | (204.70) | (204.70) | (204.70) |
| Elongation type viscoelasticity | | | | | | |
| tan δ (0° C.) | 0.306 | 0.350 | 0.342 | 0.309 | 0.347 | 0.345 |
| tan δ (60° C.) | 0.212 | 0.210 | 0.202 | 0.176 | 0.172 | 0.174 |
| Abrasion resistance (index) | 100 | 112 | 111 | 100 | 98 | 99 |

Examples II-9 to II-16 and Comparative Examples
II-5 to II-6

Synthesis of Modified Polybutene (i) A mixture of 502 g (0.3267 mol) of maleated-terminated polybutene (made by Nihon Petrochemicals Japan, number average molecular weight of 1,260, maleation ratio: 82%) and 44.8 g (0.3267 mol) of aminobenzoic acid was heated and stirred at 150° C. for 2 hours and at 120° C. for 5 hours. The disappearance of the absorption of the acid anhydride ring around 3 ppm was confirmed by NMR and it was confirmed that the reaction was proceeding. Further, 12.53 g (0.212 mol) of propylamine or 57.14 g (0.212 mol) of stearylamine were added to 290.4 g (0.212 mol) of the product and the mixture heated and stirred at 120° C. for 5 hours to give propyl onium salt type modified polybutene (PAO-PIB) (see following reaction formula) or stearyl onium salt type modified polybutene (SAO-PIB). NMR confirmed the absorption of carboxylic acid around 8 ppm and the disappearance of absorption of amine near 5 ppm and it was confirmed that the reaction was proceeding.

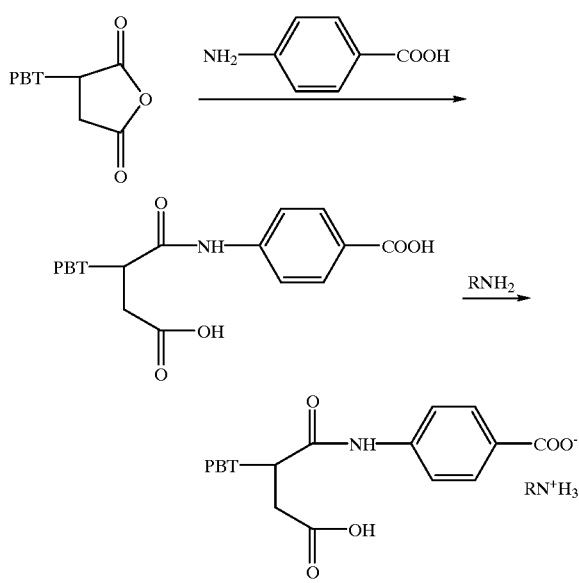

wherein R is $C_3H_7$ (PAO-PIB) or $C_{18}H_{37}$ (SAO-PIB) and PBT indicates polybutene.

(ii) 76.53 g of maleated polybutene (made by Nippon Petrochemicals, number average molecular weight of 2,900, maleation rate 70%) and 1.153 g (0.0195 mol) of propylamine or 5.256 g (0.0195 mol) of stearylamine were heated and stirred at 80° C. for 12 hours for synthesis. The reaction products were subjected to IR analysis, whereupon it was confirmed that the absorption of carbonyl of 1715 $cm^{-1}$ shifted to 1712 $cm^{-1}$ and that the reaction was proceeding. Further, the product was heated and stirred at 120° C. for 5 hours under vacuum to remove water and synthesize propylimide type polybutene (PAI-PIB) (see following reaction formula) or stearylimide type polybutene (SAI-PIB). IR analysis was used to confirm that the absorption of carbonyl shifted to 1702 $cm^{-1}$ and that the reaction was proceeding.

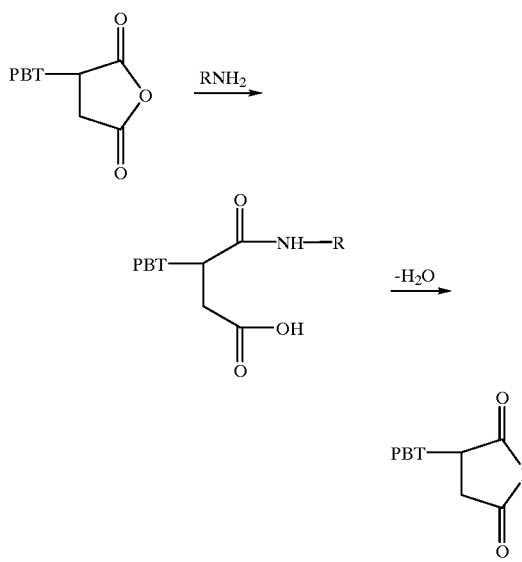

wherein R is $C_3H_7$ (PAI-PIB) or $C_{18}H_{37}$ (SAI-PIB) and PBT indicates polybutene

Preparation of Sample

The ingredients of each of the formulations (parts by weight) shown in Table II-3 except for the vulcanization accelerator and sulfur were kneaded by a 1.8 liter internal mixer for 3 to 5 minutes. The vulcanization accelerator and sulfur were kneaded by an 8-inch open roll into the master batch discharged when the temperature reached 165±5° C. to obtain a rubber composition.

Next, the composition was vulcanized by being pressed in a 15×15×0.2 cm mold at 160° C. for 20 minutes to prepare the intended test piece (rubber sheet) which was then used to evaluate the vulcanized properties, that is, the 50% modulus, tan δ (0° C. and 60° C.), and abrasion resistance. The results are shown in Table II-3.

TABLE II-3

| | Comp. Ex. II-5 | Ex. II-9 | Ex. II-10 | Ex. II-11 | Ex. II-12 |
|---|---|---|---|---|---|
| Formulation (parts by weight) | | | | | |
| SBR | 100.00 | 100.00 | 100.00 | 100.00 | 100.00 |
| Carbon HAF | 50.00 | 50.00 | 50.00 | 50.00 | 50.00 |
| Silica | — | — | — | — | — |
| Si69 | — | — | — | — | — |
| DEG | — | — | — | — | — |
| Zinc oxide | 3.00 | 3.00 | 3.00 | 3.00 | 3.00 |
| Stearic acid | 1.00 | 1.00 | 1.00 | 1.00 | 1.00 |
| Antioxidant | 1.50 | 1.50 | 1.50 | 1.50 | 1.50 |
| Aromatic oil | 10.00 | — | — | 10.00 | — |
| PAO-PIB | — | 10.00 | — | — | — |
| SAO-PIB | — | — | 10.00 | — | — |
| PAI-PIB | — | — | — | 10.00 | — |
| SAI-PIB | — | — | — | — | 10.00 |
| Sulfur | 2.10 | 2.10 | 2.10 | 2.10 | 2.10 |
| Vulcanization accelerator CZ | 1.00 | 1.00 | 1.00 | 1.00 | 1.00 |
| Vulcanization accelerator DPG | — | — | — | — | — |
| (Total) | (168.60) | (168.60) | (168.60) | (168.60) | (168.60) |
| Elongation type viscoelasticity | | | | | |
| tan δ (0° C.) | 0.324 | 0.367 | 0.345 | 0.360 | 0.358 |
| tan δ (60° C.) | 0.233 | 0.235 | 0.233 | 0.235 | 0.234 |
| Abrasion resistance (index) | 100 | 100 | 105 | 103 | 104 |

| | Comp. Ex. II-6 | Ex. II-13 | Ex. II-14 | Ex. II-15 | Ex. II-16 |
|---|---|---|---|---|---|
| Formulation (parts by weight) | | | | | |
| SBR | 100.00 | 100.00 | 100.00 | 100.00 | 100.00 |
| Carbon HAF | — | — | — | — | — |
| Silica | 50.00 | 50.00 | 50.00 | 50.00 | 50.00 |
| Si69 | 6.00 | 6.00 | 6.00 | 6.00 | 6.00 |
| DEG | 2.00 | 2.00 | 2.00 | 2.00 | 2.00 |
| Zinc oxide | 3.00 | 3.00 | 3.00 | 3.00 | 3.00 |
| Stearic acid | 2.00 | 2.00 | 2.00 | 2.00 | 2.00 |
| Antioxidant | 1.50 | 1.50 | 1.50 | 1.50 | 1.50 |
| Aromatic oil | 10.00 | — | — | — | — |
| PAO-PIB | — | 10.00 | — | — | — |

TABLE II-3-continued

| | | | | | |
|---|---|---|---|---|---|
| SAO-PIB | — | — | 10.00 | — | — |
| PAI-PIB | — | — | — | 10.00 | — |
| SAI-PIB | — | — | — | — | 10.00 |
| Sulfur | 1.70 | 1.70 | 1.70 | 1.70 | 1.70 |
| Vulcanization accelerator CZ | 2.00 | 2.00 | 2.00 | 2.00 | 2.00 |
| Vulcanization accelerator DPG | 1.00 | 1.00 | 1.00 | 1.00 | 1.00 |
| (Total) | (179.20) | (179.20) | (179.20) | (179.20) | (179.20) |
| Elongation type viscoelasticity | | | | | |
| tan δ (0° C.) | 0.310 | 0.351 | 0.320 | 0.357 | 0.354 |
| tan δ (60° C.) | 0.129 | 0.130 | 0.130 | 0.128 | 0.130 |
| Abrasion resistance (index) | 100 | 98 | 99 | 101 | 101 |

Examples II-17 to II-29 and Comparative Examples II-7 to II-8

Synthesis of Modified Polybutene(polyisobutylene)
(i) Maleated polybutene (maleated PIB) Product obtained from by Nippon Petrochemicals (Japan)
(ii) TEMPO-PIB 100 g of maleated polybutene (number average molecular weight of 2,900, maleation rate of 70%) and 4.81 g (0.0243 mol) of 4-hydroxy-TEMPO were heated and stirred at 120° C. for 12 hours to synthesize MPIB-TEMPO by the following reaction. The reaction was confirmed by IR. It was confirmed that the absorption of the carbonyl of the acid anhydride of 1715 cm$^{-1}$ shifted to 1738 cm$^{-1}$ due to the esterification by the ring opening.

(iii) SOH-PIB
Modified polybutene synthesized in Examples II-1 to II-4
(iv) SAO-PIB
Modified polybutene synthesized in Examples II-9 to II-16
(v) SNH-PIB
Modified polybutene synthesized in Examples II-5 to II-8
(vi) SAI-PIB
Modified polybutene synthesized in Examples II-9 to II-16
(vii) AS-PIB (aminosilane-PIB)

100 g of maleated polybutene (number average molecular weight of 2,900, maleation ratio 70% (made by Nihon Sekiyu Kagaku K.K. Japan)) and 9.13 g (0.0509 mol) of 3-aminopropyl trimethoxysilane (A1110 made by Nippon Unicar) were heated and stirred at 80° C. for 12 hours for synthesis. The reaction product was analyzed by IR, whereupon it was confirmed that the absorption of the carbonyl of 1715 cm$^{-1}$ shifted to 1738 cm$^{-1}$ and that the next reaction was proceeding.

Preparation of Sample

The ingredients of each of the formulations (parts by weight) shown in Table II-4 except for the vulcanization accelerator and sulfur were kneaded by a 1.8 liter internal mixer for 3 to 5 minutes. The vulcanization accelerator and sulfur were kneaded by an 8-inch open roll into the master batch discharged when the temperature reached 165±5° C. to obtain a rubber composition.

Next, the composition was vulcanized by being pressed in a 15×15×0.2 cm mold at 160° C. for 20 minutes to prepare the intended test piece (rubber sheet) which was then used to evaluate the vulcanized properties, that is, the 50% modulus, tan δ (0° C. and 60° C.), and abrasion resistance. The results are shown in Table II-4.

TABLE II-4

| | Comp. Ex. II-17 | Ex. II-17 | Ex. II-18 | Ex. II-19 | Ex. II-20 | Ex. II-21 | Ex. II-22 | Ex. II-23 |
|---|---|---|---|---|---|---|---|---|
| Formulation (parts by weight) | | | | | | | | |
| SBR | 100.00 | 100.00 | 100.00 | 100.00 | 100.00 | 100.00 | 100.00 | 100.00 |
| Silica | — | — | — | — | — | — | — | — |
| Si69 | — | — | — | — | — | — | — | — |
| DEG | — | — | — | — | — | — | — | — |
| Carbon HAF | 50.00 | 50.00 | 50.00 | 50.00 | 50.00 | 50.00 | 50.00 | 50.00 |
| Zinc oxide | 3.00 | 3.00 | 3.00 | 3.00 | 3.00 | 3.00 | 3.00 | 3.00 |
| Stearic acid | 1.00 | 1.00 | 1.00 | 1.00 | 1.00 | 1.00 | 1.00 | 1.00 |
| Antioxidant | 1.50 | 1.50 | 1.50 | 1.50 | 1.50 | 1.50 | 1.50 | 1.50 |
| Aromatic oil | 10.00 | — | — | — | — | — | — | — |
| PIB maleide | — | 5.00 | 5.00 | 5.00 | 5.00 | 5.00 | 5.00 | 4.00 |
| TEMPO-PIB | — | 5.00 | — | — | — | — | — | 1.00 |
| SOH-PIB | — | — | 5.00 | — | — | — | — | 1.00 |
| SAO-PIB | — | — | — | 5.00 | — | — | — | 1.00 |
| SNH-PIB | — | — | — | — | 5.00 | — | — | 1.00 |
| SAI-PIB | — | — | — | — | — | 5.00 | — | 1.00 |
| AS-PIB | — | — | — | — | — | — | 5.00 | 1.00 |
| Sulfur | 2.10 | 2.10 | 2.10 | 2.10 | 2.10 | 2.10 | 2.10 | 2.10 |
| Vulcanization accelerator CZ | 1.00 | 1.00 | 1.00 | 1.00 | 1.00 | 1.00 | 1.00 | 1.00 |
| Vulcanization accelerator DPG | — | — | — | — | — | — | — | — |
| (Total) | (168.60) | (168.60) | (168.60) | (168.60) | (168.60) | (168.60) | (168.60) | (168.60) |
| Elongation type viscoelasticity | | | | | | | | |
| tan δ (0° C.) | 0.324 | 0.367 | 0.366 | 0.344 | 0.358 | 0.356 | 0.357 | 0.363 |
| tan δ (60° C.) | 0.233 | 0.235 | 0.234 | 0.235 | 0.235 | 0.233 | 0.236 | 0.233 |

TABLE II-4-continued

| | | | | | | | | |
|---|---|---|---|---|---|---|---|---|
| Abrasion resistance (index) | 100 | 101 | 102 | 104 | 105 | 103 | 104 | 102 |

| | Comp. Ex. II-8 | Ex. II-23 | Ex. II-24 | Ex. II-25 | Ex. II-26 | Ex. II-27 | Ex. II-28 | Ex. II-29 |
|---|---|---|---|---|---|---|---|---|
| Formulation (parts by weight) | | | | | | | | |
| SBR | 100.00 | 100.00 | 100.00 | 100.00 | 100.00 | 100.00 | 100.00 | 100.00 |
| Silica | 50.00 | 50.00 | 50.00 | 50.00 | 50.00 | 50.00 | 50.00 | 50.00 |
| Si69 | 6.00 | 6.00 | 6.00 | 6.00 | 6.00 | 6.00 | 6.00 | 6.00 |
| DEG | 2.00 | 2.00 | 2.00 | 2.00 | 2.00 | 2.00 | 2.00 | 2.00 |
| Carbon HAF | — | — | — | — | — | — | — | — |
| Zinc oxide | 3.00 | 3.00 | 3.00 | 3.00 | 3.00 | 3.00 | 3.00 | 3.00 |
| Stearic acid | 2.00 | 2.00 | 2.00 | 2.00 | 2.00 | 2.00 | 2.00 | 2.00 |
| Antioxidant | 1.50 | 1.50 | 1.50 | 1.50 | 1.50 | 1.50 | 1.50 | 1.50 |
| Aromatic oil | 10.00 | — | — | — | — | — | — | — |
| PIB maleide | — | 5.00 | 5.00 | 5.00 | 5.00 | 5.00 | 5.00 | 4.00 |
| TEMPO-PIB | — | 5.00 | — | — | — | — | — | 1.00 |
| SOH-PIB | — | — | 5.00 | — | — | — | — | 1.00 |
| SAO-PIB | — | — | — | 5.00 | — | — | — | 1.00 |
| SNH-PIB | — | — | — | — | 5.00 | — | — | 1.00 |
| SAI-PIB | — | — | — | — | — | 5.00 | — | 1.00 |
| AS-PIB | — | — | — | — | — | — | 5.00 | 1.00 |
| Sulfur | 1.70 | 1.70 | 1.70 | 1.70 | 1.70 | 1.70 | 1.70 | 1.70 |
| Vulcanization accelerator CZ | 2.00 | 2.00 | 2.00 | 2.00 | 2.00 | 2.00 | 2.00 | 2.00 |
| Vulcanization accelerator DPG | 1.00 | 1.00 | 1.00 | 1.00 | 1.00 | 1.00 | 1.00 | 1.00 |
| (Total) | (179.20) | (179.20) | (179.20) | (179.20) | (179.20) | (179.20) | (179.20) | (179.20) |
| Elongation type viscoelasticity | | | | | | | | |
| tan δ (0° C.) | 0.310 | 0.350 | 0.349 | 0.343 | 0.356 | 0.355 | 0.354 | 0.350 |
| tan δ (60° C.) | 0.129 | 0.130 | 0.129 | 0.130 | 0.129 | 0.127 | 0.129 | 0.129 |
| Abrasion resistance (index) | 100 | 100 | 99 | 102 | 100 | 101 | 102 | 102 |

As explained above, according to the present invention, by mixing an acid anhydride-modified polybutene (polyisobutylene) into a diene-based rubber, the tan δ balance (that is, the grip performance of a tire when used as the material for a tire tread) is improved and the abrasion resistance is improved as well, so the polymer is particularly useful as a rubber composition for a pneumatic tire.

Examples III and Comparative Examples III

The following commercially available products were used for the formulation ingredients shown in Table III-1 used for the formulations of the following Examples and Comparative Examples. The methods of measurement of the physical properties are also shown below.

BR: Nipol BR1220 (made by Nippon Zeon K.K. Japan)
IR: Nipol IR2200 (made by Nippon Zeon K.K. Japan)
Carbon black: HAF-HS Shoblack N339 (made by Showa Cabot K.K. Japan)
Silica: Nipsil AQ (made by Nihon Silica K.K. Japan)
Silane coupling agent: Si69 (made by Degussa)
Zinc oxide: Ginrei Zinc White R (made by Toho Aen K.K. Japan)
Stearic acid: Beads Stearic Acid Kiri (made by Nihon Yushi K.K. Japan)
Antioxidant: Vulkanox 4020 (made by Bayer)
Sulfur: Oil-treated sulfur (made by Karuizawa Seirensho, Japan)
Vulcanization accelerator: Noccelar CZ-G (made by Ouchi Shinko Kagaku K.K. Japan)
Aromatic oil: Desolex No. 3 (made by Showa Shell Sekiyu K.K. Japan)
Polybutene: Commercially available polymer comprised of Nisseki Polybutene HV-1900 (molecular weight 2900) to which some n-butene is copolymerized (made by Japan Oil)
Maleic anhydride-modified polybutene: Prototype of Nippon Petrochemicals (Japan) (produced by reaction between Exomethylene type polybutene and maleic anhydride) (molecular weight 3000)

Measurement of Physical Properties

Mooney viscosity: $ML_{1+4}$, temperature 100° C., rotor L, 10 kg/cm $M_{50}$: 50% modulus when pulling No. 3 dumbbell at tensile speed of 500 mm/minute tan δ (0° C. and 60° C.)

Rheographsolid manufactured by Toyo Seiki Seisakusho (Japan) was used under the conditions of an initial strain of 10%, a dynamic strain of 2% and a frequency 20 Hz (sample width: 5 mm) at 0° C. or 60° C. according to a method of JIS H7002.

tan δ balance: 0° C. tan δ value/60° C. tan δ value

Abrasion resistance (index): 2-series Lambourn test (slip rate 25%, load 5 kg, time 4 minutes, temperature RT, K-80 grindstone). Note that the results are shown indexed to the value of Comparative Example III-1 as 100. The larger the value, the better the abrasion resistance shown.

Examples III-1 to III-5 and Comparative Examples III-1 to III-5

Preparation of Sample

The ingredients of each of the formulations shown in Table III-1 except for the vulcanization accelerator and sulfur were kneaded by a 1.8 liter internal mixer for 3 to 5 minutes. The vulcanization accelerator and sulfur were kneaded by an 8-inch open roll into the master batch discharged when the temperature reached 165±5° C. to obtain a rubber composition. The unvulcanized property of the rubber composition obtained (Mooney viscosity) was measured. The results are shown in Table III-1.

Next, the composition was vulcanized by being pressed in a 15×15×0.2 cm mold at 160° C. for 20 minutes to prepare the intended test piece (rubber sheet) which was then used to evaluate the vulcanized properties, that is, the 50% modulus, tan δ (0° C. and 60° C.), and abrasion resistance. The results are shown in Table III-1.

Sekiyu Kagaku K.K., Japan) and 9.13 g (0.0509 mol) of 3-aminopropyl trimethoxysilane (A1110 available from Nihon Unicar K.K. Japan) were stirred under heating at 80° C. for 12 hours to synthesize the modified polybutene. The reaction product was subjected to IR analysis, whereby the absorption of carbonyl at 1715 cm$^{-1}$ was shifted to 1738 cm$^{-1}$ and the following reaction was confirmed.

TABLE III-1

| Formulation and physical properties | Comp. Ex. III-1 | Comp. Ex. III-2 | Comp. Ex. III-3 | Comp. Ex. III-4 | Ex. III-1 | Ex. III-2 | Ex. III-3 | Ex. III-4 | Ex. III-5 | Comp. Ex. III-5 |
|---|---|---|---|---|---|---|---|---|---|---|
| BR | 100.0 | — | 100.0 | — | 100.0 | — | — | — | — | 100.0 |
| IR | — | 100.0 | — | 100.0 | — | 100.0 | 100.0 | 100.0 | 100.0 | — |
| Maleic anhydride modified polybutene | — | — | — | — | 10.0 | 10.0 | 50.0 | 50.0 | 70.0 | 90.0 |
| Polybutene* | — | — | — | 10.0 | — | — | — | — | — | — |
| Aromatic oil | — | — | 15.0 | — | — | — | — | — | — | — |
| Carbon black | 50.0 | 50.0 | 50.0 | 50.0 | 50.0 | 50.0 | 50.0 | 45.0 | 50.0 | 50.0 |
| Silica | — | — | — | — | — | — | — | 5.0 | — | — |
| Zinc oxide | 3.0 | 3.0 | 3.0 | 3.0 | 3.0 | 3.0 | 3.0 | 3.0 | 3.0 | 3.0 |
| Stearic acid | 1.0 | 1.0 | 1.0 | 1.0 | 1.0 | 1.0 | 1.0 | 1.0 | 1.0 | 1.0 |
| Antioxidant | 1.0 | 1.0 | 1.0 | 1.0 | 1.0 | 1.0 | 1.0 | 1.0 | 1.0 | 1.0 |
| Sulfur | 1.1 | 1.1 | 1.1 | 1.1 | 1.1 | 1.1 | 1.1 | 1.1 | 1.1 | 1.1 |
| Vulcanization accelerator | 1.1 | 1.1 | 1.1 | 1.1 | 1.1 | 1.1 | 1.1 | 1.1 | 1.1 | 1.1 |
| Silane coupling agent | — | — | — | — | — | — | — | 0.5 | — | — |
| Unvulcanized physical properties Mooney viscosity (ML$_{1+4}$) | 93 | 88 | 65 | 85 | 90 | 86 | 78 | 75 | 65 | 52 |
| Vulcanized physical properties | | | | | | | | | | |
| Hardness | 70 | 68 | 58 | 61 | 60 | 59 | 41 | 40 | 39 | 34 |
| 50% modulus (MPa) | 1.3 | 1.0 | 0.9 | 0.8 | 1.1 | 0.8 | 0.6 | 0.5 | 0.5 | 0.4 |
| Elongation (%) | 372 | 469 | 590 | 619 | 512 | 640 | 690 | 695 | 702 | 710 |
| tan δ (0° C.) | 0.21 | 0.26 | 0.25 | 0.28 | 0.33 | 0.37 | 0.38 | 0.35 | 0.38 | 0.36 |
| tan δ (60° C.) | 0.18 | 0.18 | 0.21 | 0.22 | 0.23 | 0.23 | 0.25 | 0.22 | 0.27 | 0.30 |
| tan δ balance (0° C./60° C.) | 1.20 | 1.39 | 1.19 | 1.27 | 1.43 | 1.61 | 1.52 | 1.59 | 1.41 | 1.20 |
| Abrasion resistance (index) | 100 | 87 | 101 | 95 | 143 | 135 | 138 | 145 | 118 | 95 |

As will be clear from the results of Table III-1, the rubber compositions of Examples III-1 to III-5 satisfying all of the requirements defined in the present invention are improved in the tan δ balance and abrasion resistance compared with Comparative Examples III-1 and III-2 where no maleic anhydride-modified polybutene is mixed. Further, Comparative Example III-4 shows that an ordinary aromatic oil softening agent lowers the tan δ balance. Comparative Example III-4 shows that addition of an ordinary polybutene lowers the tan δ balance and the abrasion resistance. Comparative Example III-5 is the case of addition of a large amount of 90 parts by weight of the maleic anhydride-modified polybutene and shows that this lowers the tan δ balance and abrasion resistance.

As explained above, according to the present invention, by mixing an acid anhydride-modified polybutene into a diene rubber, the rubber composition is softened and the processability is improved and, further, the tan δ balance (that is, the grip performance of a tire when used as the material for a tire tread) is improved and the abrasion resistance is improved as well, so the polymer is particularly useful as a rubber composition for a pneumatic tire.

Example IV and Comparative Example IV
Examples IV-1 and IV-2 and Comparative Example IV-1 and IV-2
Synthesis of Modified Polybutene 100 g of maleated polybutene (number average molecular weight of 2900, maleation rate of 70% available from Nihon

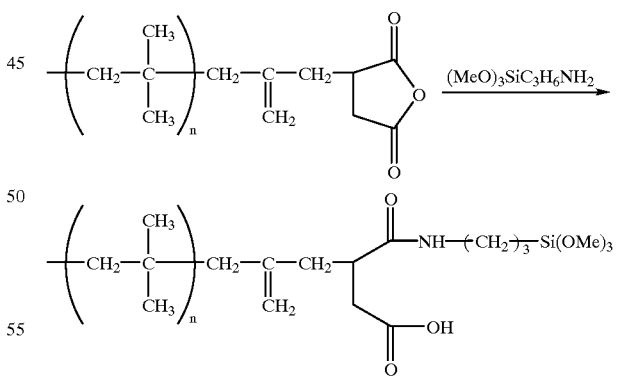

Preparation of Sample

The ingredients of each of the formulations (parts by weight) shown in Table IV-1 except for the vulcanization accelerator and sulfur were kneaded by a 1.8 liter internal mixer for 3 to 5 minutes. The vulcanization accelerator and sulfur were kneaded by an 8-inch open roll into the master batch discharged when the temperature reached 165±5° C. to obtain a rubber composition. The unvulcanized property (i.e., Mooney viscosity) of the resultant rubber composition was determined.

Next, the composition was vulcanized by being pressed in a 15×15×0.2 cm mold at 160° C. for 20 minutes to prepare the intended test piece (rubber sheet) which was then used to evaluate the vulcanized properties, i.e., elongation type viscoelasticity and abrasion resistance. The methods of the determinations are as follows.

Unvulcanized Physical Property

1) Mooney Viscosity:

Determined at 100° C. according to a JIS K6300 method, that is, the 50% modulus, tan δ (0° C. and 60° C.), and abrasion resistance.

Vulcanized Physical Property

2) Tan δ (0° C. and 60° C.)

Rheographsolid manufactured by Toyo Seiki Seisakusho (Japan) was used under the conditions of an initial strain of 10%, a dynamic strain of 2% and a frequency 20 Hz (sample width: 5 mm) at 0° C. or 60° C. according to a method of JIS H7002.

3) Lambourn Abrasion

Each of the various rubber compositions obtained was measured for lambourn abrasion based on JIS K6264. This was performed at a temperature of 20° C., at a load of 1.5 kg and a slip rate of 50%. The results are shown as relative values indexed to the value of the abrasion resistance index of Comparative Example IV-1 as 100. The results are shown in Table IV-1.

TABLE IV-1

| Formulation (wt. part) | Comp. Ex. IV-1 | Ex. IV-1 | Comp. Ex. IV-2 | Ex. IV-2 |
|---|---|---|---|---|
| Oil-extended SBR *1 | 137.50 | 123.75 | 137.50 | 123.75 |
| Carbon black *2 | 50.00 | 50.00 | — | — |
| Silica *3 | — | — | 75.00 | 75.00 |
| Silane coupling agent *4 | — | — | 6.00 | 6.00 |
| Zinc oxide *5 | 3.00 | 3.00 | 3.00 | 3.00 |
| Stearic acid *6 | 1.00 | 1.00 | 2.00 | 2.00 |
| Ethylene glycol | — | — | 2.00 | 2.00 |
| Antioxidant 6C *7 | 2.00 | 2.00 | 2.00 | 2.00 |
| Modified polybutene | — | 10.00 | — | 10.00 |
| Sulfur *8 | 2.10 | 2.10 | 1.70 | 1.70 |
| Vulcanization accelerator CZ *9 | 1.00 | 1.00 | 2.00 | 2.00 |
| Vulcanization accelerator DEG *10 | — | — | 1.00 | 1.00 |
| | | | 1.00 | 1.00 |
| Total | 196.60 | 192.85 | 232.85 | 228.45 |
| Unvulcanized physical property | | | | |
| Mooney viscosity | | | | |
| Initial torque | 82.0 | 80.0 | 111.4 | 143.8 |
| $ML_{1+4}$ | 55.4 | 50.4 | 81.2 | 93.4 |
| Vulcanized physical property | | | | |
| Elongation type viscoelasticity | | | | |
| tan δ (0° C.) | 0.360 | 0.425 | 0.403 | 0.460 |

TABLE IV-1-continued

| Formulation (wt. part) | Comp. Ex. IV-1 | Ex. IV-1 | Comp. Ex. IV-2 | Ex. IV-2 |
|---|---|---|---|---|
| tan δ (60° C.) | 0.187 | 0.200 | 0.178 | 0.176 |
| Abrasion resistance (index) | 100.0 | 114.5 | 100.0 | 102.1 |

(Remark)
*1: Oil extended SBR: Nipol 9520 (Nippon Zeon K.K. Japan)
*2: Carbon black: DIA I (Mitsubishi Kagaku K.K. Japan)
*3: Silica: Nipzil AQ (Nihon Silica K.K. Japan)
*4: Silane coupling agent: Si 69 (Degussa) (Chemical name: Bis-[3-(triethoxysilyl)-propyl]tetrasulfide)
*5: Zinc oxide: Ginrei zinc oxide R (Toho Aen K.K. Japan)
*6: Stearic acid: Industrial use stearic acid (Nihon Yushi K.K. Japan)
*7: Antioxidant 6C: N-phenyl-N'-(1,3-dimethylbutyl)-p-phenylenediamine (Sumitomo Kagaku K.K., Japan)
*8: Sulfur: Powdered sulfur (Karuizawa Seirensho, Japan)
*9: Vulcanization accelerator CZ: Noccelar CZ-G (Ouchi Shinko Kagaku K.K. Japan) (chemical name: N-cyclohexyl-2-benzothiazyl sulfenamide)
*10: Vulcanization accelerator DPG: Noccelar-D (Ouchi Shinko Kagaku K.K. Japan) (chemical name: diphenyl guaanidine)

As is clear from the results shown in Table IV-1, the rubber compositions (i.e., Examples IV-1 and IV-2) containing the modified polybutene according to the present invention compounded therein have excellent Mooney viscosity, excellent tan δ balance and extremely improved abrasion resistance, when compared with the rubber compositions containing no modified polybutene (i.e., Comparative Examples IV-1 and IV-2).

As explained above, the rubber composition according to the fourth aspect of the present invention containing the polymer having the alkoxysilane and the hydrogen bondable moiety at the end of the molecule or in the inside of the molecule exhibits the improved viscoelastic characteristics and abrasion resistance, and therefore, useful as a rubber composition for tire, etc.

What is claimed is:

1. A polymer comprising isobutylene as repeating units and having, in the main chain, at the end and/or at the side chain of the polymer chain thereof, at least one free radical selected from the group consisting of nitroxide radicals, hydrazyl radicals, aryloxy radicals, and trityl radicals stably present at a room temperature and in the presence of oxygen.

2. A polymer as claimed in claim 1, wherein its chain end at least one free radical selected from the group consisting of nitroxide radicals, hydrazyl radicals, aryloxy radicals, and trityl radicals stably present at a room temperature and in the presence of oxygen is present at the end of the polymer chain thereof.

3. A polymer as claimed in claim 1, wherein the polymer having the isobutylene as repeating units is a polyisobutylene, polybutene, butyl rubber, brominated butyl rubber, isobutylene-maleic anhydride copolymer or isobutylene-p-methyl styrene-p-bromomethyl styrene copolymer.

4. A polymer as claimed in claim 1, having at least one alkoxy silane moiety in the polymer chain thereof.

* * * * *